United States Patent
Patton

(10) Patent No.: US 10,631,593 B2
(45) Date of Patent: Apr. 28, 2020

(54) FLUID-FILLED CHAMBER WITH A STABILIZATION STRUCTURE

(76) Inventor: Levi J. Patton, Portland, OR (US)

(*) Notice: Subject to any disclaimer, the term of this patent is extended or adjusted under 35 U.S.C. 154(b) by 2365 days.

(21) Appl. No.: 13/590,892

(22) Filed: Aug. 21, 2012

(65) Prior Publication Data

US 2014/0053427 A1 Feb. 27, 2014

(51) Int. Cl.
*A43B 13/18* (2006.01)
*A43B 13/20* (2006.01)
*B29D 35/12* (2010.01)

(52) U.S. Cl.
CPC .......... *A43B 13/189* (2013.01); *A43B 13/20* (2013.01); *B29D 35/122* (2013.01); *B29D 35/128* (2013.01)

(58) Field of Classification Search
None
See application file for complete search history.

(56) References Cited

U.S. PATENT DOCUMENTS

| | | |
|---|---|---|
| 1,088,328 A | 2/1914 | Cucinotta |
| 2,743,510 A | 5/1956 | Mauney et al. |
| 3,015,148 A | 1/1962 | Haddad |
| 3,205,106 A | 9/1965 | Cross |
| 3,253,355 A | 5/1966 | Menken |
| 3,359,610 A | 12/1967 | Faircloth |
| 3,984,926 A | 10/1976 | Calderon |
| 4,025,974 A | 5/1977 | Lea et al. |
| 4,219,945 A | 9/1980 | Rudy |
| 4,287,250 A | 9/1981 | Rudy |
| 4,364,188 A | 12/1982 | Turner et al. |
| 4,397,104 A | 8/1983 | Doak |
| 4,513,449 A | 4/1985 | Donzis |
| 4,619,055 A | 10/1986 | Davidson |
| 4,761,321 A | 8/1988 | McCall et al. |
| 4,874,640 A | 10/1989 | Donzis |
| 4,906,502 A | 3/1990 | Rudy |

(Continued)

FOREIGN PATENT DOCUMENTS

| | | |
|---|---|---|
| CN | 101516223 A | 8/2009 |
| DE | 10260694 A1 | 6/2004 |

(Continued)

OTHER PUBLICATIONS

International Search Report and Written Opinion dated Jul. 22, 2014 in PCT/US2013/055760.

(Continued)

*Primary Examiner* — Laura C Powers
(74) *Attorney, Agent, or Firm* — Honigman LLP; Matthew H. Szalach; Jonathan P. O'Brien

(57) ABSTRACT

A chamber may include a first barrier portion, a second barrier portion, a peripheral bond, an interior bond, and a fold. The first barrier portion defines a first surface of the chamber. The second barrier portion defines a second surface of the chamber, the first surface being opposite the second surface. The peripheral bond joins the first barrier portion and the second barrier portion to form an interior void within the chamber and seal a fluid within the interior void. The interior bond is spaced inward from the peripheral bond and joins the first barrier portion and the second barrier portion. Additionally, the fold is in the second barrier portion and extends away from the interior bond and through a majority of a thickness of the chamber.

20 Claims, 39 Drawing Sheets

(56) References Cited

U.S. PATENT DOCUMENTS

| | | | |
|---|---|---|---|
| 5,083,361 A | 1/1992 | Rudy | |
| 5,134,790 A | 8/1992 | Woitschaetzke et al. | |
| 5,369,896 A | 12/1994 | Frachey et al. | |
| 5,543,194 A | 8/1996 | Rudy | |
| 5,572,804 A | 11/1996 | Skaja et al. | |
| 5,630,237 A | 5/1997 | Ku | |
| 5,704,137 A | 1/1998 | Dean et al. | |
| 5,713,141 A | 2/1998 | Mitchell et al. | |
| 5,741,568 A | 4/1998 | Rudy | |
| 5,744,222 A | 4/1998 | Sugihara | |
| 5,802,739 A | 9/1998 | Potter et al. | |
| 5,918,383 A | 7/1999 | Chee | |
| 5,952,065 A | 9/1999 | Mithcell | |
| 5,987,781 A | 11/1999 | Pavesi et al. | |
| 5,993,585 A | 11/1999 | Goodwin et al. | |
| 6,029,962 A | 2/2000 | Shorten et al. | |
| 6,041,521 A | 3/2000 | Wong | |
| 6,082,025 A | 7/2000 | Bonk | |
| 6,098,313 A | 8/2000 | Skaja | |
| 6,119,371 A | 9/2000 | Goodwin et al. | |
| 6,127,010 A | 10/2000 | Rudy | |
| 6,385,864 B1 | 5/2002 | Sell, Jr. et al. | |
| 6,668,740 B2 | 12/2003 | Kawamura et al. | |
| 6,758,068 B2 | 7/2004 | Shirasaki et al. | |
| 6,770,581 B1 | 8/2004 | DeMott et al. | |
| 6,830,793 B2 | 12/2004 | Hawkins et al. | |
| 6,837,951 B2 | 1/2005 | Rapaport | |
| 7,060,156 B2 | 6/2006 | MacK et al. | |
| 7,070,845 B2 | 7/2006 | Thomas et al. | |
| 7,080,467 B2 | 7/2006 | Marvin et al. | |
| 7,131,218 B2 | 11/2006 | Schindler | |
| 7,174,750 B2 | 2/2007 | Shirasaki et al. | |
| 7,213,421 B2 | 5/2007 | Shirasaki et al. | |
| 7,235,504 B2 | 6/2007 | Shirasaki et al. | |
| 7,418,837 B2 | 9/2008 | Muller et al. | |
| 7,562,469 B2 | 7/2009 | Dojan et al. | |
| 7,707,743 B2 | 5/2010 | Schindler et al. | |
| 7,752,772 B2 | 7/2010 | Hatfield et al. | |
| 7,774,955 B2 | 8/2010 | Goodwin et al. | |
| 7,913,520 B1 | 3/2011 | Chen et al. | |
| 8,151,486 B2 | 4/2012 | Dua | |
| 2002/0121031 A1 | 9/2002 | Smith et al. | |
| 2003/0096548 A1 | 5/2003 | Groitzsch | |
| 2003/0097767 A1 | 5/2003 | Perkinson | |
| 2004/0261293 A1* | 12/2004 | Marvin | A43B 13/203 36/29 |
| 2005/0039346 A1 | 2/2005 | Thomas et al. | |
| 2005/0037777 A1 | 5/2005 | Goodwin | |
| 2006/0137221 A1 | 6/2006 | Dojan et al. | |
| 2007/0169376 A1 | 7/2007 | Hatfield et al. | |
| 2007/0169379 A1 | 7/2007 | Hazenberg et al. | |
| 2007/0212959 A1 | 9/2007 | Johnson | |
| 2009/0288313 A1 | 11/2009 | Rapaport et al. | |
| 2009/0300949 A1 | 12/2009 | Frederick et al. | |
| 2012/0233878 A1* | 9/2012 | Hazenberg | A43B 13/20 36/29 |

FOREIGN PATENT DOCUMENTS

| | | | |
|---|---|---|---|
| JP | H04329901 A | 11/1992 | |
| JP | H08510656 A | 11/1996 | |
| JP | 2009524451 A | 7/2009 | |
| WO | 2012125349 A1 | 9/2012 | |
| WO | WO-2012125349 A1 * | 9/2012 | A43B 13/20 |

OTHER PUBLICATIONS

Japan Patent Office, Notification of Reason for Refusal for JP Patent Application No. 2015-528579, dated Feb. 18, 2016.
State Intellectual Property Office, Office Action for CN Application No. 201380040545.9, dated Sep. 17, 2015.
State Intellectual Property Office, Office Action for CN Application No. 201380040545.9, dated Nov. 23, 2016.
European Patent Office, Extended European Search Report for EP Application No. 18000400.4, dated Oct. 9, 2018.

* cited by examiner

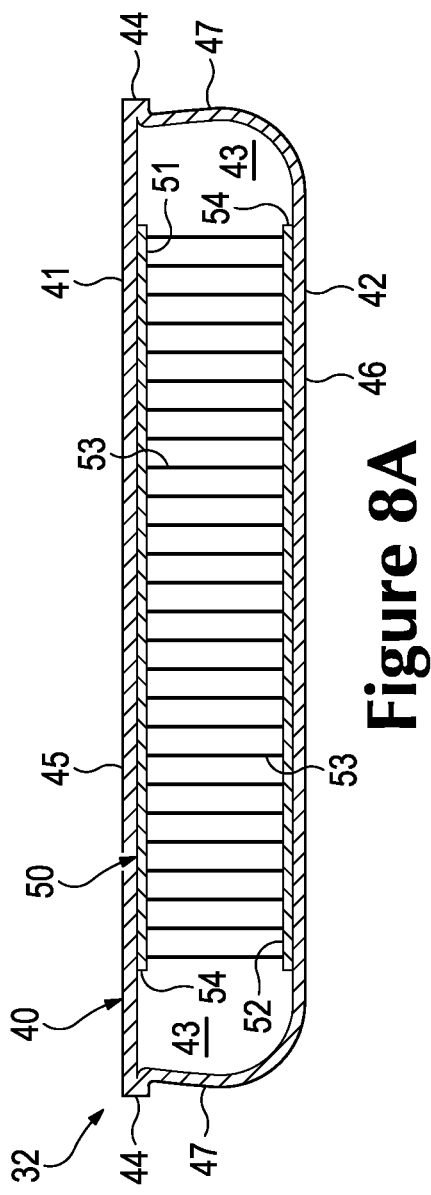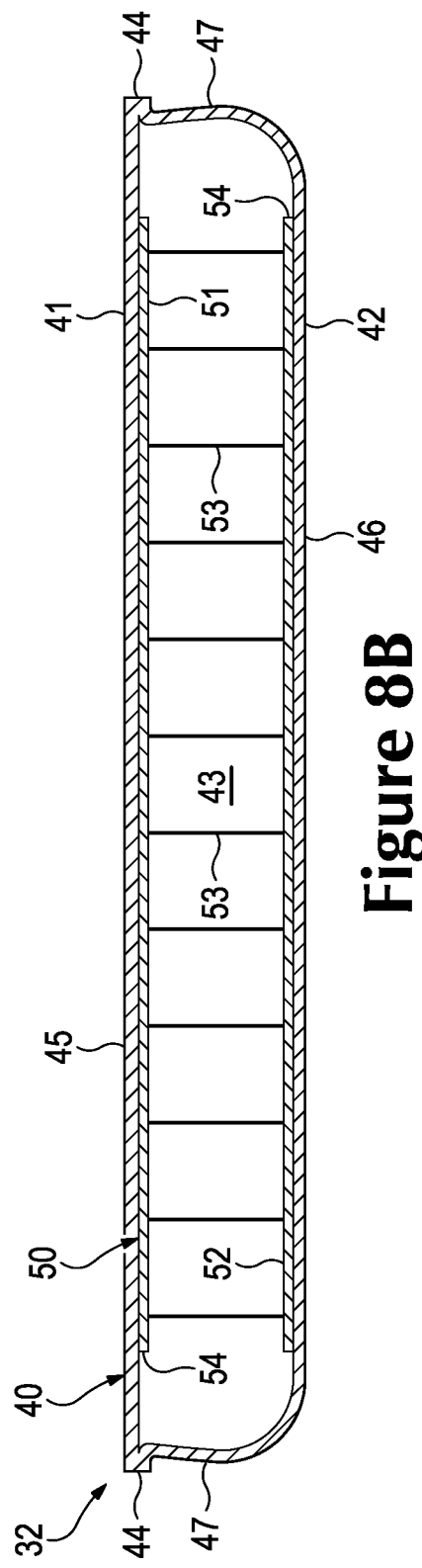

FLUID-FILLED CHAMBER WITH A STABILIZATION STRUCTURE

BACKGROUND

Articles of footwear generally include two primary elements: an upper and a sole structure. The upper is often formed from a plurality of material elements (e.g., textiles, polymer sheet layers, polymer foam layers, leather, synthetic leather) that are stitched or adhesively bonded together to form a void within the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust fit of the footwear, as well as permitting entry and removal of the foot from the void within the upper. In addition, the upper may include a tongue that extends under the lacing system to enhance adjustability and comfort of the footwear, and the upper may incorporate a heel counter for stabilizing the heel area of the foot.

The sole structure is secured to a lower portion of the upper and positioned between the foot and the ground. In athletic footwear, for example, the sole structure often includes a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. In some configurations, the midsole may be primarily formed from a fluid-filled chamber. The outsole forms a ground-contacting element of the footwear and is usually fashioned from a durable and wear-resistant rubber material that includes texturing to impart traction. The sole structure may also include a sockliner positioned within the void of the upper and proximal a lower surface of the foot to enhance footwear comfort.

SUMMARY

A chamber may include a first barrier portion, a second barrier portion, a peripheral bond, an interior bond, and a fold. The first barrier portion defines a first surface of the chamber. The second barrier portion defines a second surface of the chamber, the first surface being opposite the second surface. The peripheral bond joins the first barrier portion and the second barrier portion to form an interior void within the chamber and seal a fluid within the interior void. The interior bond is spaced inward from the peripheral bond and joins the first barrier portion and the second barrier portion. Additionally, the fold is in the second barrier portion and extends away from the interior bond and through a majority of a thickness of the chamber.

A method of manufacturing a chamber may include molding a barrier to include a first barrier portion and a second barrier portion that define an interior void. A tensile member is located within the interior void and unsecured to at least one of the first barrier portion and the second barrier portion. The first barrier portion, the second barrier portion, and the tensile member are compressed and heated after the step of molding to bond the tensile member to the first barrier portion and the second barrier portion.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

DETAILED DESCRIPTION

The following discussion and accompanying figures disclose various configurations of a fluid-filled chamber. Although the chamber is disclosed with reference to footwear having a configuration that is suitable for running, concepts associated with the chamber may be applied to a wide range of athletic footwear styles, including basketball shoes, cross-training shoes, football shoes, golf shoes, hiking shoes and boots, ski and snowboarding boots, soccer shoes, tennis shoes, and walking shoes, for example. Concepts associated with the chamber may also be utilized with footwear styles that are generally considered to be non-athletic, including dress shoes, loafers, sandals, and work boots. In addition to footwear, the chamber may be incorporated into other types of apparel and athletic equipment, including helmets, gloves, and protective padding for sports such as football and hockey. A similar chamber may also be incorporated into cushions and other compressible structures utilized in household goods and industrial products.

General Footwear Structure

Figure 1:
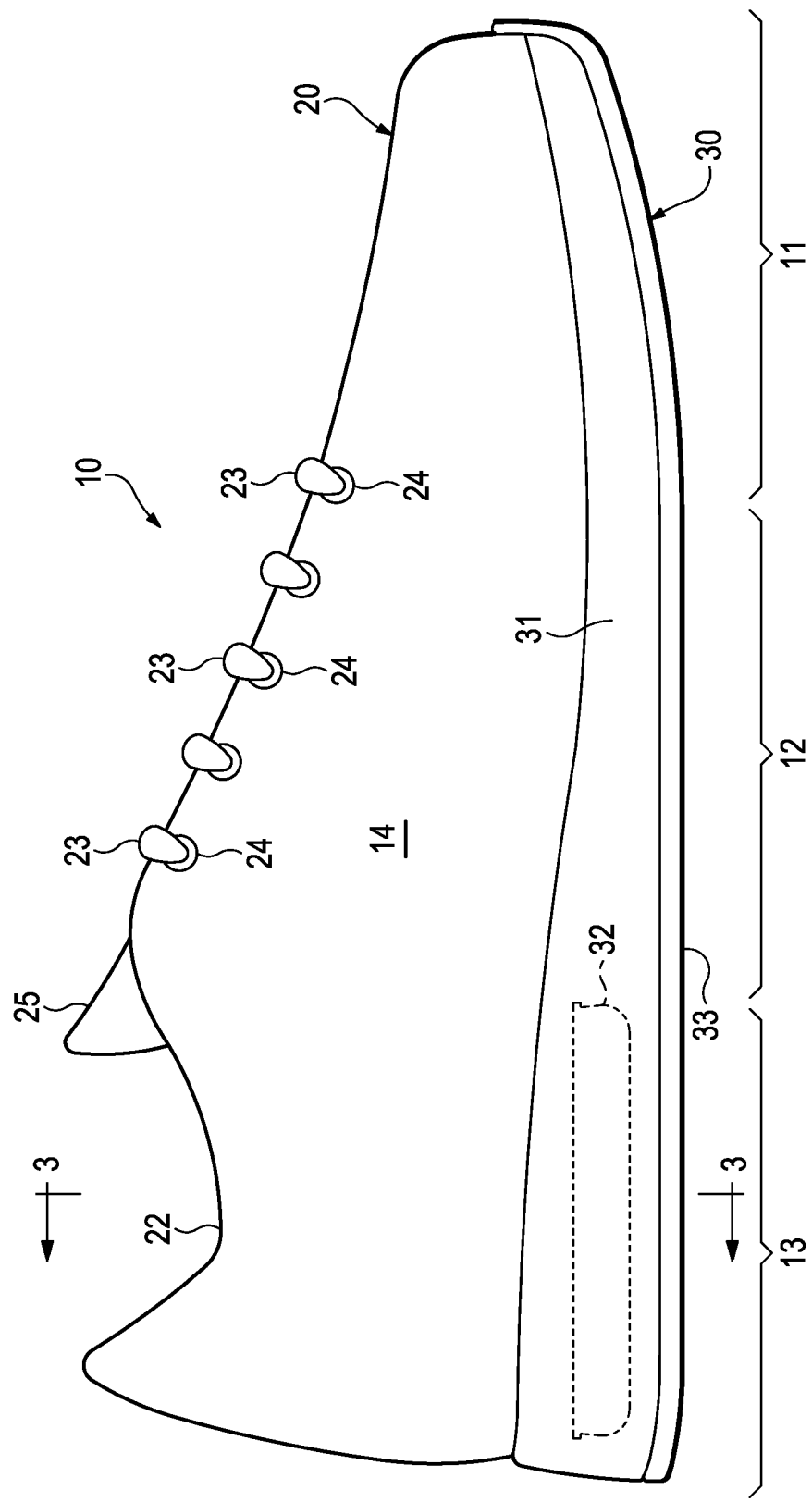
FIG. 1 is a lateral side elevational view of an article of footwear incorporating a fluid-filled chamber.
Figure 2:
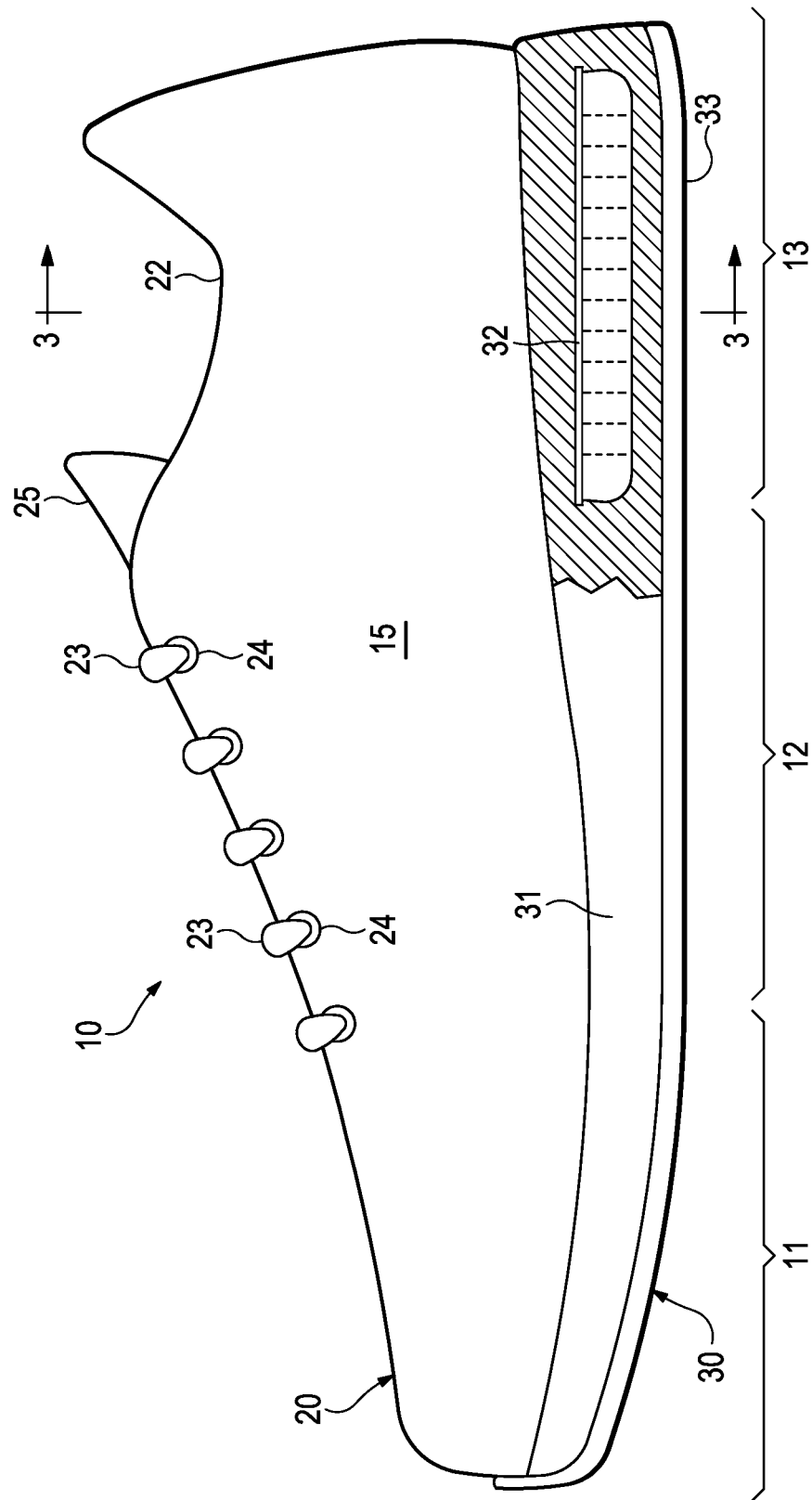
FIG. 2 is a medial side elevational view of the article of footwear.
Figure 3:
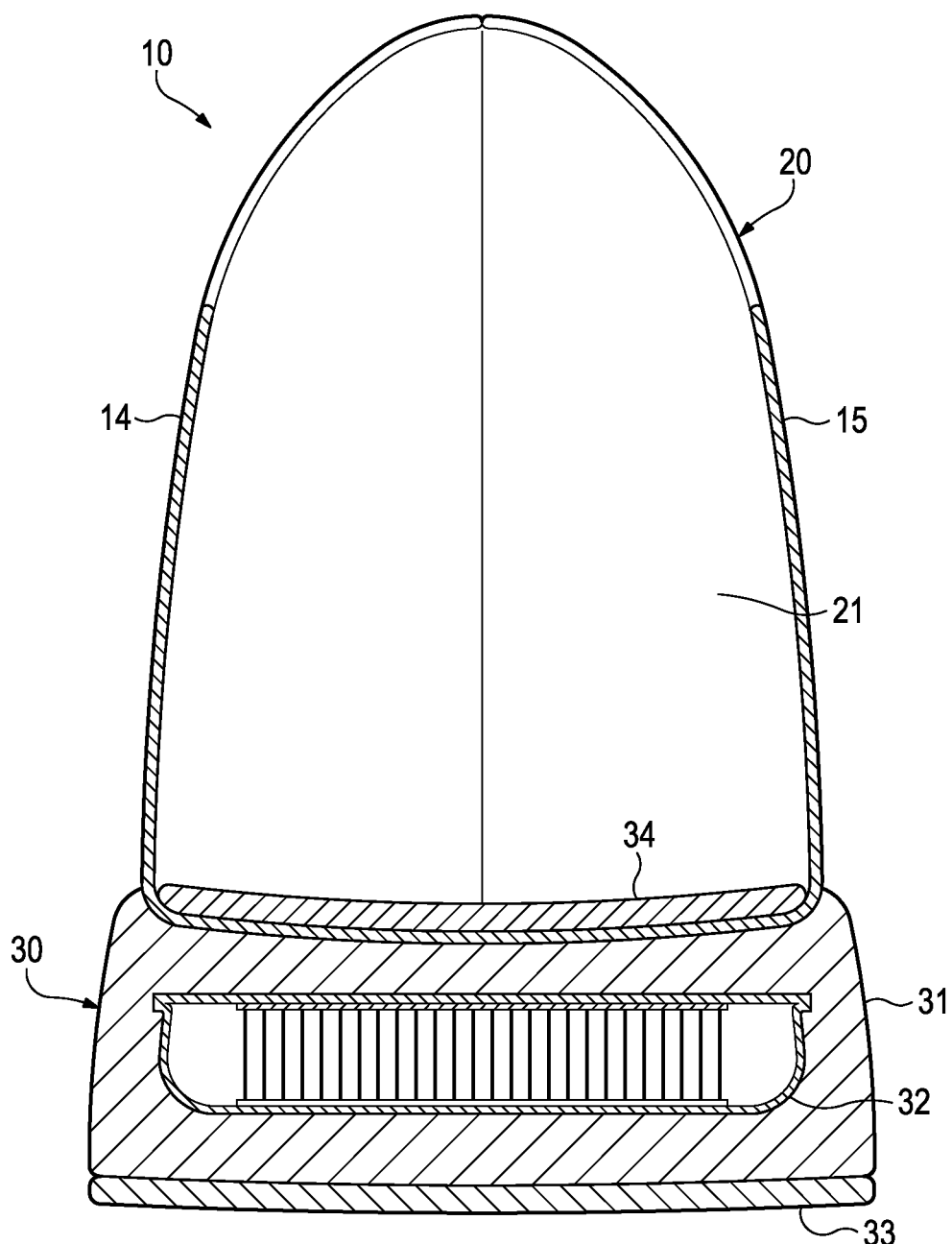
FIG. 3 is a cross-sectional view of the article of footwear, as defined by section line 3 in FIGS. 1 and 2.
Figure 4:
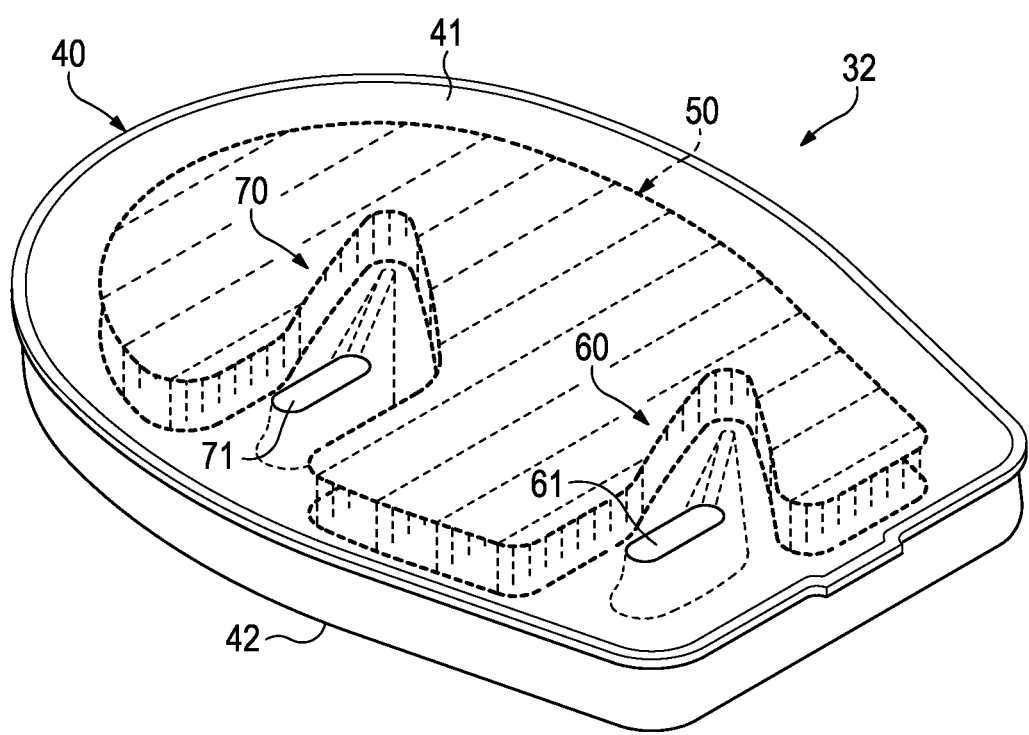
FIG. 4 is a perspective view of the chamber.
Figure 5:
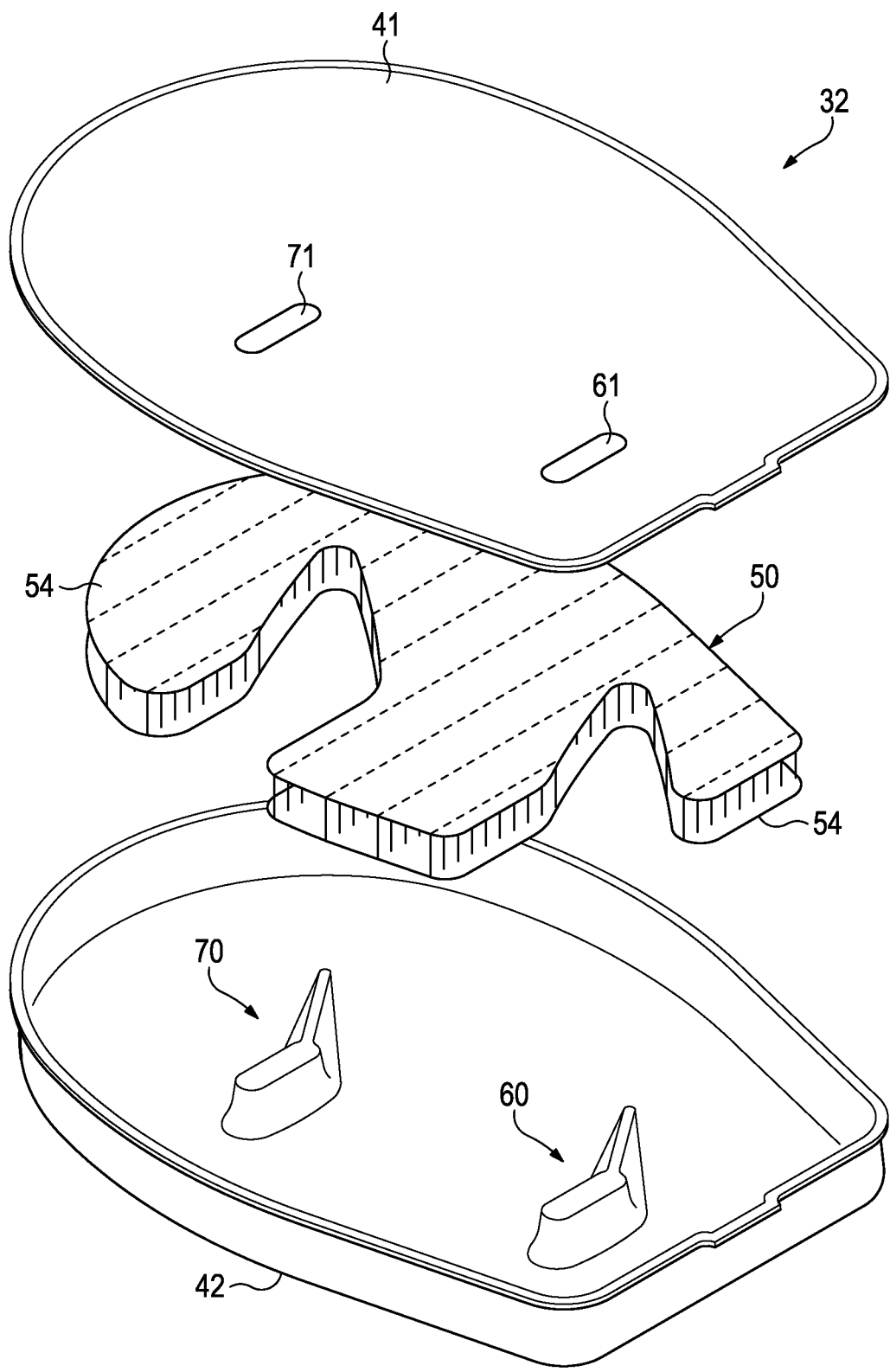
FIG. 5 is an exploded perspective view of the chamber.
Figure 6:
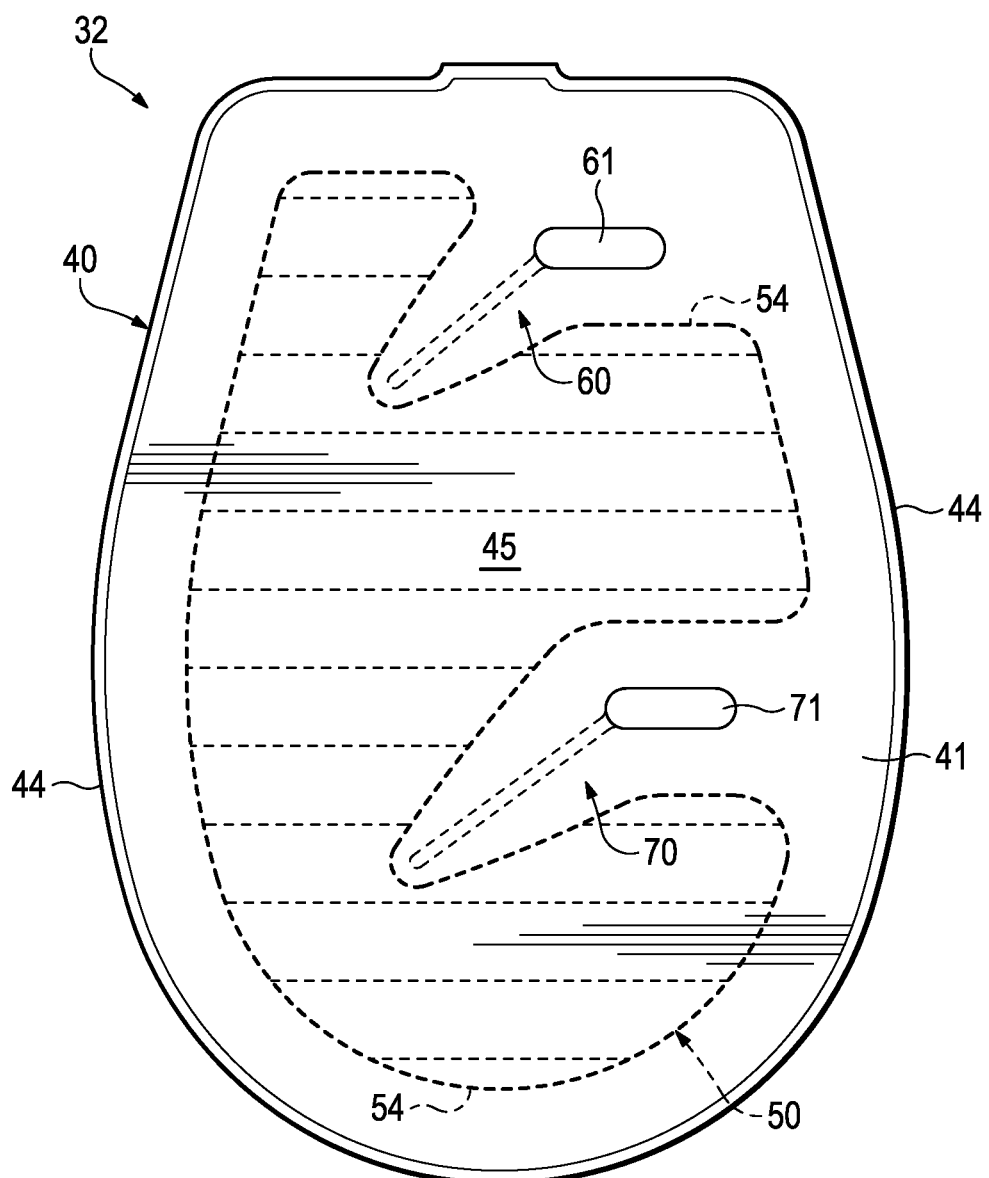
FIG. 6 is a top plan view of the chamber.
Figure 7:
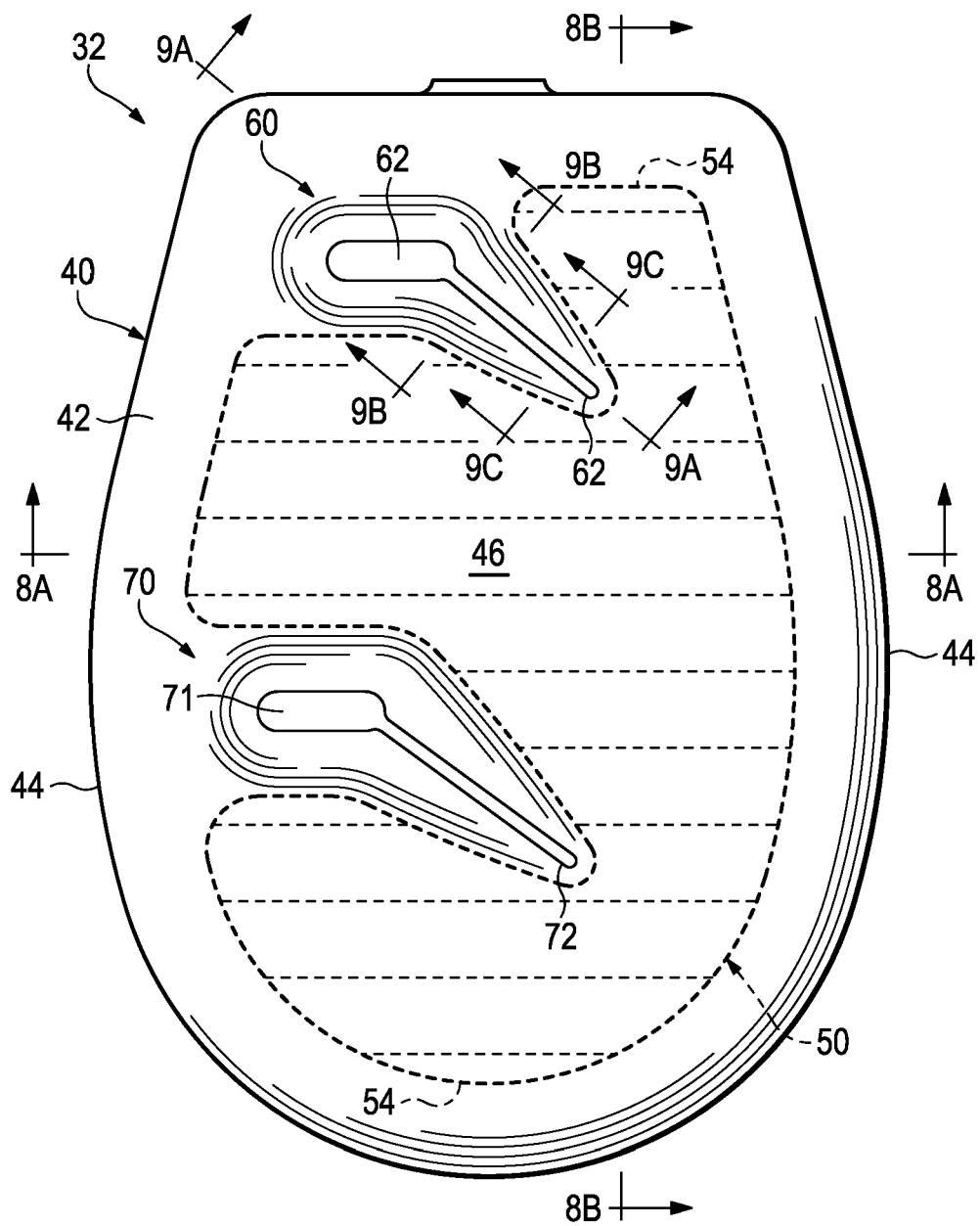
FIG. 7 is a bottom plan view of the chamber.
Figure 8C:
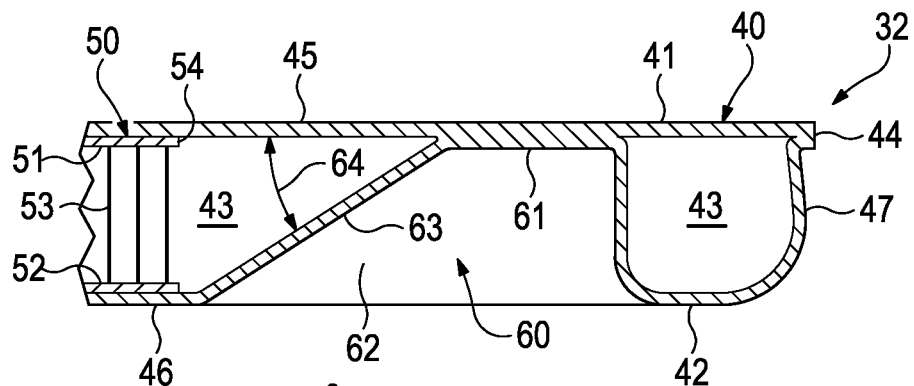
FIGS. 8A and 8B are cross-sectional views of the chamber, as defined by section lines 8A and 8B in FIG. 7.
Figure 8D:
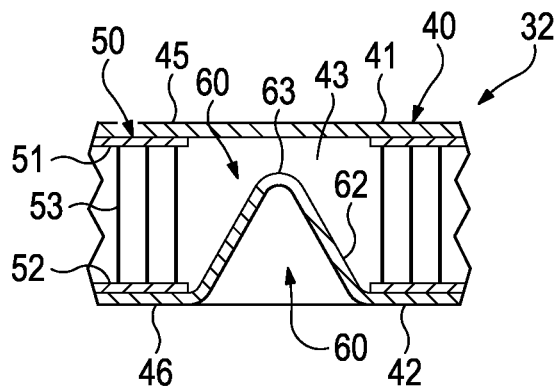
Figure 8E:
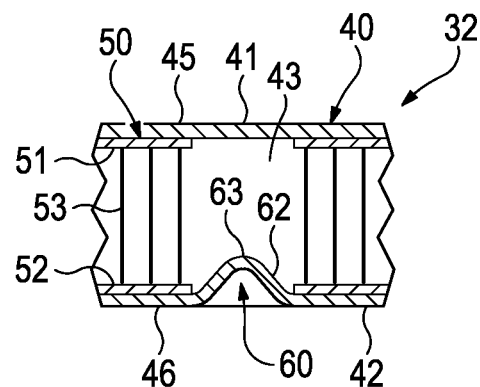

An article of footwear 10 is depicted in FIGS. 1-3 as including an upper 20 and a sole structure 30. Upper 20 provides a comfortable and secure covering for a foot of a wearer. As such, the foot may be located within upper 30 to effectively secure the foot within footwear 10. Sole structure 30 is secured to a lower area of upper 20 and extends between upper 20 and the ground. When the foot is located within upper 20, sole structure 30 extends under the foot to attenuate ground reaction forces (i.e., cushion the foot), provide traction, enhance stability, and influence the motions of the foot, for example.

For purposes of reference in the following discussion, footwear 10 may be divided into three general regions: a forefoot region 11, a midfoot region 12, and a heel region 13. Forefoot region 11 generally includes portions of footwear 10 corresponding with the toes and the joints connecting the metatarsals with the phalanges. Midfoot region 12 generally includes portions of footwear 10 corresponding with an arch area of the foot. Heel region 13 generally corresponds with rear portions of the foot, including the calcaneus bone. Footwear 10 also includes a lateral side 14 and a medial side 15, which extend through each of regions 11-13 and correspond with opposite sides of footwear 10. More particularly, lateral side 14 corresponds with an outside area of the foot (i.e. the surface that faces away from the other foot), and medial side 15 corresponds with an inside area of the foot (i.e., the surface that faces toward the other foot). Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Upper 20 is depicted as having a substantially conventional configuration formed from a variety of elements (e.g., textiles, polymer sheet layers, polymer foam layers, leather, synthetic leather) that are stitched, bonded, or otherwise joined together to provide a structure for receiving and securing the foot relative to sole structure 30. The various elements of upper 20 define a void 21, which is a generally hollow area of footwear 10 with a shape of the foot, that is intended to receive the foot. As such, upper 20 extends along the lateral side of the foot, along the medial side of the foot, over the foot, around a heel of the foot, and under the foot. Access to void 21 is provided by an ankle opening 22 located in at least heel region 13. A lace 23 extends through various lace apertures 24 for modifying dimensions of upper 20 to accommodate the proportions of the foot. More particularly, lace 23 permits the wearer to tighten upper 20 around the foot, and lace 23 permits the wearer to loosen upper 20 to facilitate entry and removal of the foot from void 21 (i.e., through ankle opening 22). As an alternative to lace apertures 24, upper 20 may include other lace-receiving elements, such as loops, eyelets, hooks, and D-rings. In addition, upper 20 includes a tongue 25 that extends between void 21 and lace 23 to enhance the comfort and adjustability of footwear 10. In some configurations, upper 20 may incorporate other elements, such as reinforcing members, aesthetic features, a heel counter that limits heel movement in heel region 13, a wear-resistant toe guard located in forefoot region 11, or indicia (e.g., a trademark) identifying the manufacturer. Accordingly, upper 20 is formed from a variety of elements that form a structure for receiving and securing the foot.

The primary elements of sole structure 30 are a midsole 31, a fluid-filled chamber 32, an outsole 33, and a sockliner 34. Midsole 31 may be formed from a polymer foam material, such as polyurethane or ethylvinylacetate, that encapsulates chamber 32. In addition to the polymer foam material and chamber 32, midsole 31 may incorporate one or more additional footwear elements that enhance the comfort, performance, or ground reaction force attenuation properties of footwear 10, including plates, moderators, lasting elements, or motion control members, for example. Although absent in some configurations, outsole 33 is secured to a lower surface of midsole 31 and may be formed from a rubber material that provides a durable and wear-resistant surface for engaging the ground. Outsole 33 may also be textured to enhance the traction (i.e., friction) properties between footwear 10 and the ground. Sockliner 34 is a compressible member located within void 21 and adjacent a lower surface of the foot to enhance the comfort of footwear 10.

Chamber 32 has a shape that fits within a perimeter of midsole 31 and extends (a) through a heel region 13 and (b) from lateral side 14 to medial side 15. Although the polymer foam material of midsole 31 is depicted as extending entirely around chamber 32, the polymer foam material of midsole 31 may expose portions of chamber 32. For example, chamber 32 may form a portion of (a) a sidewall of midsole 31 or (b) an upper or lower surface of midsole 31 in some configurations of footwear 10. When the foot is located within upper 20, chamber 32 extends under substantially all of a heel of the foot in order to attenuate ground reaction forces that are generated when sole structure 30 is compressed between the foot and the ground during various ambulatory activities, such as running and walking. In other configurations, chamber 32 may have a different shape or structure, chamber 32 may extend under other areas of the foot, or chamber 32 may extend throughout a length and a width of sole structure 30.

Chamber Configuration

Chamber 32 is depicted separate from footwear 10 in each of FIGS. 4-9C. The primary elements of chamber 32 are a barrier 40 and a tensile member 50. In general, barrier 40 forms an inflated and sealed structure, and tensile member 50 is located within barrier 40 to retain an intended shape of chamber 32. Although many aspects of chamber 32 are discussed below, examples of chambers that include both barriers and tensile members are disclosed in (a) U.S. patent application Ser. No. 12/123,612, which was filed in the U.S. Patent and Trademark Office on 20 May 2008 and entitled Fluid-Filled Chamber With A Textile Tensile Member; (b) U.S. patent application Ser. No. 12/123,646, which was filed in the U.S. Patent and Trademark Office on 20 May 2008 and entitled Contoured Fluid-Filled Chamber With A Tensile Member; and (c) U.S. Pat. No. 7,070,845 to Thomas, et al., each of which is incorporated herein by reference.

Barrier 40 is formed from a polymer material that includes a first or upper barrier portion 41 and an opposite second or lower barrier portion 42. Barrier portions 41 and 42 (a) form an exterior of chamber 32, (b) define an interior void 43 that receives both a pressurized fluid and tensile member 50, and (c) provide a durable and sealed structure for retaining the pressurized fluid within chamber 32. A peripheral bond 44 extends around a periphery of chamber 32 and bonds, welds, joins, or otherwise secures edge areas of barrier portions 41 and 42 to each other. In effect, peripheral bond 44 joins barrier portions 41 and 42 to form a seal for the pressurized fluid within interior void 43.

An exterior of barrier 40 includes a first surface 45, an opposite second surface 46, and a sidewall surface 47 that extends between surfaces 45 and 46. Whereas first surface 45 is formed by upper barrier portion 41, second surface 46 and sidewall surface 47 are formed by lower barrier portion 42. As discussed below, the presence of tensile member 50 imparts a generally planar aspect to each of surfaces 45 and 46. As such, a majority of first surface 45 may substantially coincide with a first plane, and a majority of second surface 46 may substantially coincide with a second plane. In some configurations, chamber 32 may also be contoured, as disclosed in U.S. patent application Ser. Nos. 12/123,612 and 12/123,646, which were mentioned above and are incorporated herein by reference. Although areas of surfaces 45 and 46 may include some contours or other shaped features, a majority of surfaces 45 and 46 are generally planar and parallel to each other in many configurations of chamber 32.

A wide range of polymer materials may be utilized for barrier 40. In selecting a material for barrier 40, engineering properties of the material (e.g., tensile strength, stretch properties, fatigue characteristics, and dynamic modulus) and the ability of the material to prevent diffusion of the fluid contained by barrier 40 may be considered. When formed of thermoplastic urethane, for example, barrier 40 may have a thickness of approximately 1.0 millimeter, but the thickness may range from 0.2 to 4.0 millimeters or more, for example. In addition to thermoplastic urethane, examples of polymer materials that may be suitable for barrier 40 include polyurethane, polyester, polyester polyurethane, and polyether polyurethane. Barrier 40 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein layers include ethylene-vinyl alcohol copolymer, thermoplastic polyurethane, and a regrind material of the ethylene-vinyl alcohol copolymer and thermoplastic polyurethane. Another suitable material for barrier 40 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al.

The fluid within barrier 40 may be pressurized between zero and three-hundred-fifty kilopascals (i.e., approximately fifty-one pounds per square inch) or more. In addition to air and nitrogen, the fluid may include octafluorapropane or be any of the gasses disclosed in U.S. Pat. No. 4,340,626 to Rudy, such as hexafluoroethane and sulfur hexafluoride. In some configurations, chamber 32 may incorporate a valve or other structure that permits the wearer to adjust the pressure of the fluid.

Tensile member 50 is located within interior void 43 and is formed from a spacer textile material that includes a first or upper layer 51, an opposite second or lower layer 52, and a plurality of connecting members 53 that extend between layers 51 and 52 and are arranged in various substantially parallel rows. Whereas upper layer 51 is secured to an inner surface of upper barrier portion 41, lower layer 52 is secured to an inner surface of lower barrier portion 42. The fluid within interior void 43 exerts an outward force upon barrier 40, which tends to separate barrier portions 41 and 42. Tensile member 50, however, is secured to each of barrier portions 41 and 42 in order to retain the intended shape (e.g., generally planar shape of surfaces 45 and 46) of chamber 32 when pressurized. More particularly, connecting members 53 extend across the interior void and are placed in tension by the outward force of the pressurized fluid upon barrier 40, thereby preventing barrier 40 from expanding or bulging outward. Whereas peripheral bond 44 joins the polymer sheets to form a seal that prevents the fluid from escaping, tensile member 50 prevents barrier 40 from expanding outward or otherwise distending due to the pressure of the fluid. That is, tensile member 50 effectively limits the expansion of barrier portions 41 and 42 to retain the intended shape of chamber 32 and impart the generally planar aspect to each of surfaces 45 and 46. Due to the presence of tensile member 50, therefore, a majority of first surface 45 may substantially coincide with a first plane, and a majority of second surface 46 may substantially coincide with a second plane.

In manufacturing tensile member 50 one or more yarns may be knit or otherwise manipulated to (a) form layers 51 and 52 to have the configuration of knitted elements, (b) extend connecting members 53 between layers 51 and 52, and (c) join connecting members 53 to each of layers 51 and 52. Each of connecting members 53 may, therefore, be sections or segments of one or more yarns that extend between and join layers 51 and 52. Tensile member 50 also has a peripheral edge 54 that is spaced inward from peripheral bond 44 and located adjacent to peripheral bond 44. As an alternative to forming tensile member 50 as a spacer textile material, tensile member 50 may have any of the various configurations of tether elements disclosed in U.S. patent application Ser. No. 12/630,642, which was filed in the U.S. Patent and Trademark Office on 3 Dec. 2009 and entitled Tethered Fluid-Filled Chambers, which is incorporated herein by reference. Tensile member 50 may also have the configuration of a foam tensile member, as disclosed in U.S. Pat. No. 7,131,218 to Schindler, which is incorporated herein by reference.

Stabilization Structures

Chamber 32 includes a first stabilization structure 60 and a second stabilization structure 70 that impart an advantage of restricting or limiting deformation in chamber 32 due to shearing forces. Although located in different areas of chamber 32, the overall configurations of stabilization structure 60 and stabilization structure 70 are substantially identical. The following discussion will focus upon stabilization structure 60, with an understanding that each of the various concepts discussed in relation to stabilization structure 60 also applies to stabilization structure 70.

Stabilization structure 60 includes an interior bond 61 and a fold 62. Interior bond 61 is spaced inward from peripheral bond 44, thereby being located in an interior portion of chamber 32, and is an area where barrier portions 41 and 42 are bonded, welded, joined, or otherwise secured to each other. Although depicted as having an elongate shape with rounded end areas, interior bond 61 may be circular, square, rectangular, or any other regular or non-regular shape. As noted above, a majority of first surface 45 may substantially coincide with a first plane, and a majority of second surface 46 may substantially coincide with a second plane. Referring to the cross-section of FIG. 9A, for example, interior bond 61 is located closer to the first plane of first surface 45 than the second plane of second surface 46. That is, interior bond 61 may be located closer to one side of chamber 32 than an opposite side of chamber 32. Given this location, interior bond 61 forms a portion of a depression in the surface of chamber 32 formed by second barrier portion 42.

Fold 62 extends outward or away from interior bond 61. In this configuration, one end of fold 62 is located at or adjacent to interior bond 61, and an opposite end of fold 62 is spaced away from interior bond 61. Fold 62 has the configuration of a bent, wrinkled, or doubled area in the polymer material forming chamber 32. More particularly, fold 62 is an area of second barrier portion 41 that protrudes into interior void 43, as depicted in FIGS. 9B and 9C. As such, fold 62 forms a ridge within interior void 43 and another portion of the depression in the surface of chamber 32 formed by second barrier portion 42.

Figure 9A:
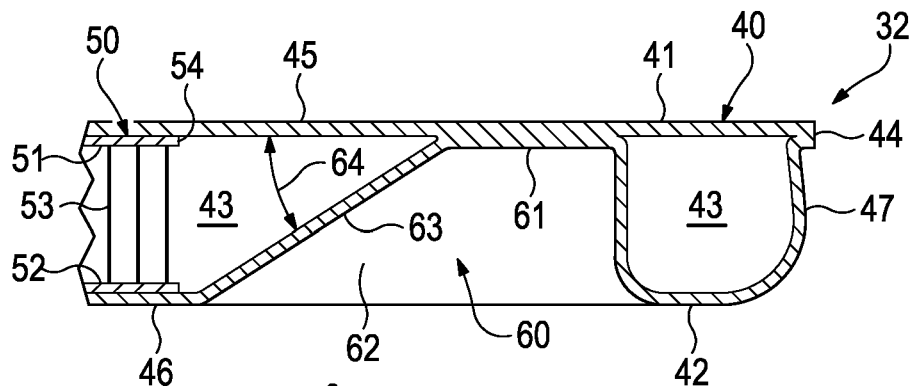
FIGS. 9A-9C are cross-sectional views of the chamber, as defined by section lines 9A-9C in FIG. 7.
Figure 9B:
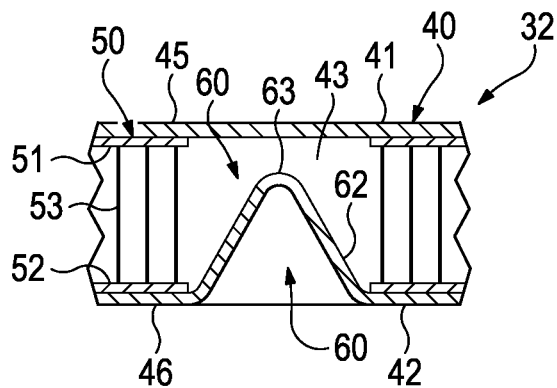
Figure 9C:
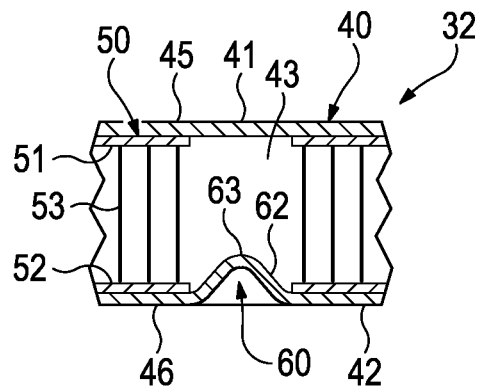

The ridge formed by fold 62 slants away from interior bond 61 and through a majority of the thickness of chamber 32, as depicted in FIG. 9A. In this configuration, the ridge effectively extends from interior bond 61 to the second plane of second surface 46. Considered another way, the ridge effectively extends from the first plane of first surface 45 to the second plane of second surface 46. More particularly, the end of fold 62 located at or adjacent to interior bond 61 is positioned proximal to the first plane of first surface 45, and the opposite end of fold 62 is positioned proximal to the second plane of second surface 46. Accordingly, fold 62 extends through the thickness of chamber 32 and between the planes of surfaces 45 and 46.

Based upon the discussion above, fold 62 slants away from interior bond 61 when extending across the thickness of chamber 32. As such, an apex 63 of fold 62 is angled with respect to planar areas of barrier portions 41 and 42. More particularly, apex 63 forms an angle 64 with the first plane of first surface 45, as depicted in FIG. 9A. Although the degree to which apex 63 slants relative to first surface 45 may vary considerably, a suitable value for angle 64 may be approximately 40 degrees. More generally, apex 63 and the first plane of first surface 45 may often form angle 64 to be in a range of 20 to 60 degrees.

Stabilization structure 70 includes an interior bond 71 and a fold 72. As noted in the discussion above, each of the various concepts discussed in relation to stabilization structure 60 also applies to stabilization structure 70. As such, for example, (a) interior bond 71 is spaced inward from peripheral bond 44, (b) interior bond 71 may be located closer to one side of chamber 32 than an opposite side of chamber 32, (c) fold 72 extends outward or away from interior bond 71, and (d) fold 72 may extend through the thickness of chamber 32 and between the planes of surfaces 45 and 46.

Although tensile member 50 extends throughout interior void 43, portions of tensile member 50 are absent in the areas of stabilization structures 60 and 70. More particularly, peripheral edge 54 defines indentations or notched areas in tensile member 50 that extend at least partially around each of stabilization structures 60 and 70. As discussed in greater detail below, tensile member 50 may form apertures that extend entirely around stabilization structures 60 and 70 in some configurations of chamber 32, or two or more separate portions of tensile member 50 may be located on opposite sides of stabilization structures 60 and 70. Accordingly, tensile member 50 may form indentations, apertures, spaces, or other absent regions in the areas of stabilization structures 60 and 70.

Figure 10A:
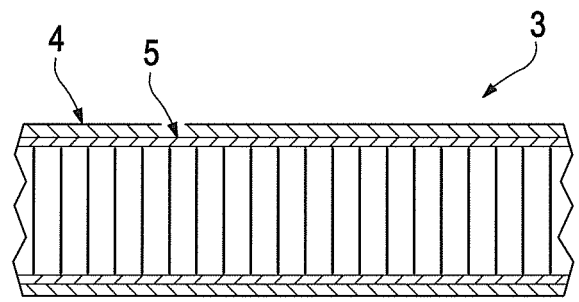
FIGS. 10A-10C are schematic cross-sectional views of portions of chambers and depicting forces applied to the chambers.
Figure 10B:
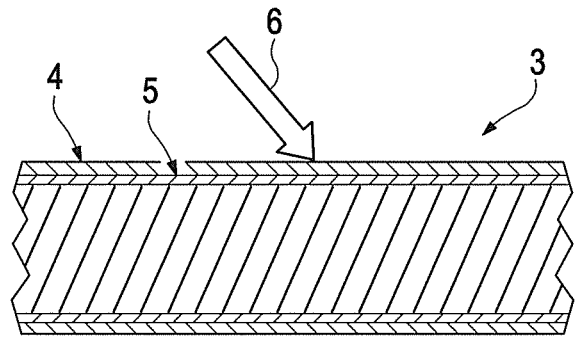
Figure 10C:
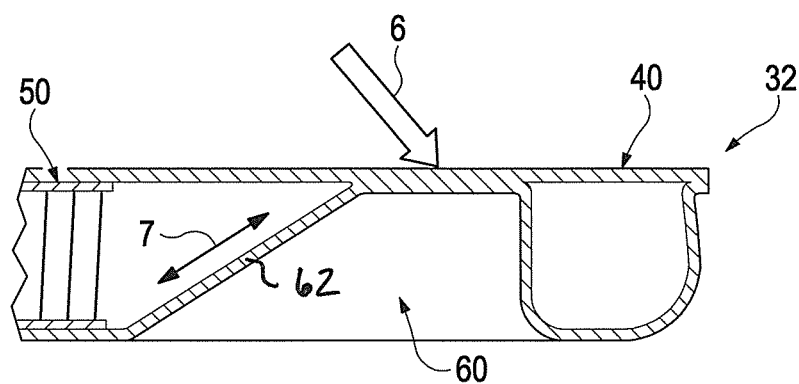

As noted above, an advantage of stabilization structures 60 and 70 is that deformation in chamber 32 due to shearing forces is restricted or limited. Referring to FIG. 10A, a cross-sectional view of a portion of a chamber 3 that includes a barrier 4 and a tensile member 5 is depicted. Unlike chamber 32, chamber 3 does not include features similar to stabilization structures 60 and 70. When a force 6 is applied to chamber 3, as depicted in FIG. 10B, shearing components of force 6 tend to deform chamber 3. More particularly, portions of barrier 4 and tensile member 5 move in a sideways direction relative to other areas of barrier 4 and tensile member 5 due to the application of force 6. In comparison with chamber 3, chamber 32 deforms to a lesser degree when force 6 is applied, as depicted in FIG. 10C. More particularly, the orientation and configuration of fold 62 resists deformation. When force 6 is applied, fold 62 is placed in tension, as shown by arrow 7 and restricts or limits deformation in chamber 32 due to shearing components of force 6. As a result, chamber 32 may impart enhanced stability to footwear 10.

Manufacturing Process

A manufacturing process for chamber 32 generally includes a molding portion and a bonding portion. During the molding portion, tensile member 50 is located between two polymer sheets that form barrier portions 41 and 42. The polymer sheets are then shaped and bonded to form barrier 40, with tensile member 50 positioned within interior void 43 and unsecured to barrier 40. During the bonding portion, tensile member 50 is secured to each of barrier portions 41 and 42. Following subsequent pressurization and sealing, the manufacturing process for chamber 32 is substantially complete. In the following discussion, the molding portion and the bonding portion of the manufacturing process will be presented in greater detail.

Figure 11:
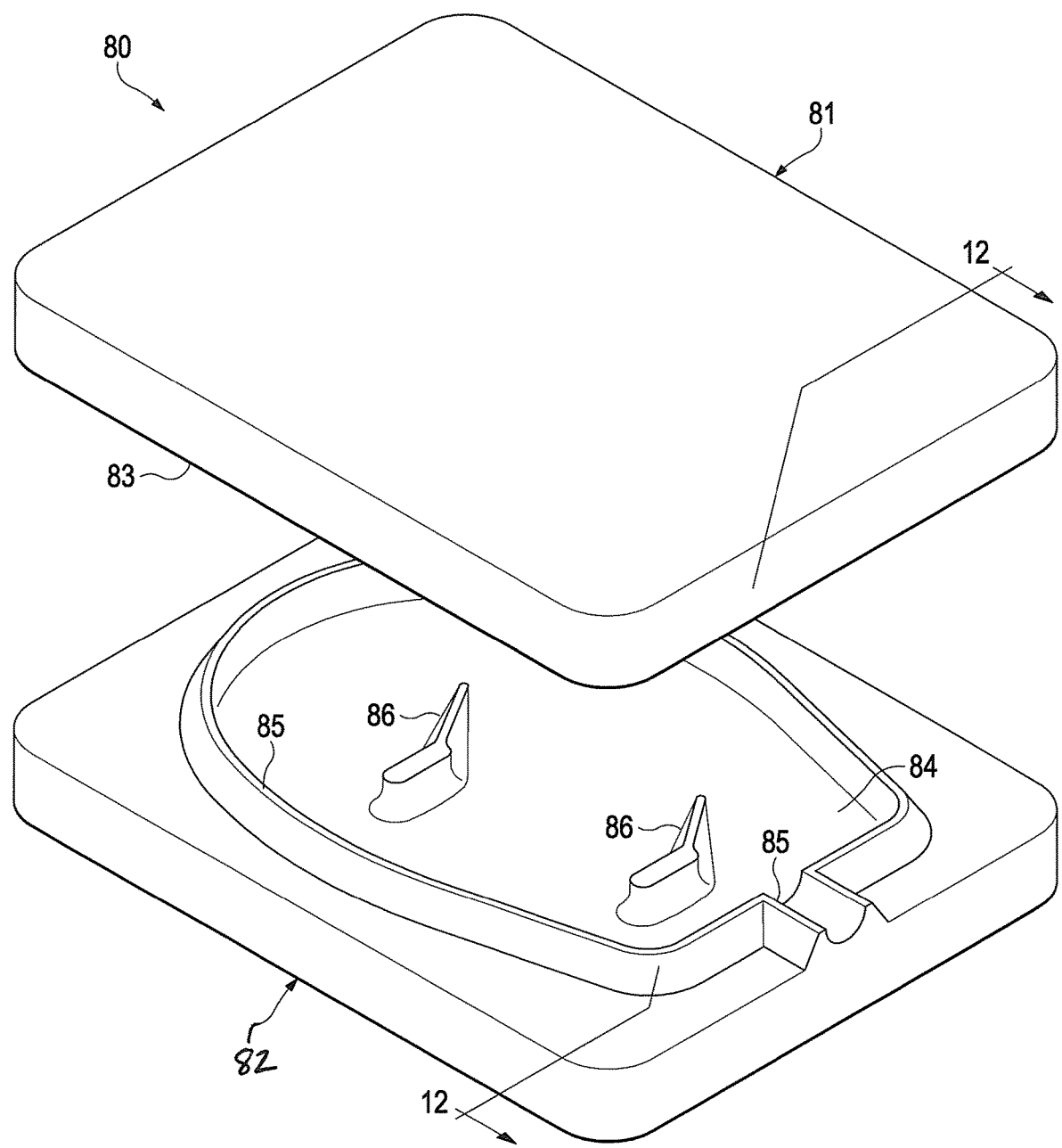
FIG. 11 is a perspective view of a mold that may be utilized in a molding portion of a manufacturing process for the chamber.

A mold 80 that is utilized during the molding portion of the manufacturing process is depicted in FIG. 11 as including a first mold portion 81 and a corresponding second mold portion 82. When joined together, mold portions 81 and 82 form a cavity having dimensions substantially equal to the exterior dimensions of chamber 32 prior to pressurization. First mold portion 81 includes a surface 83 that is substantially planar and faces toward second mold portion 82, but may have various surface features in other configurations of mold 80. Second mold portion 82 includes a depression 84 having the general shape of chamber 32. A ridge 85 extends around depression 84 and corresponds in location with peripheral bond 44, and an extension of ridge 85 extends outward from depression 84. Additionally, a pair of protrusions 86 extend outward from depression 84 and have the general shape and location of stabilization structures 60 and 70.

The manner in which mold 80 is utilized to form barrier 40 from a pair of polymer layers 87 will now be discussed. Initially, polymer layers 87 are heated to at least a glass transition temperature of the material forming polymer layers 87. This may be accomplished through radiant heating or a variety of other heating methods. Alternately, a plurality of conduits may extend through mold 80 to heat polymer layers 87 at a later stage of the molding portion of the manufacturing process.

Figure 12A:
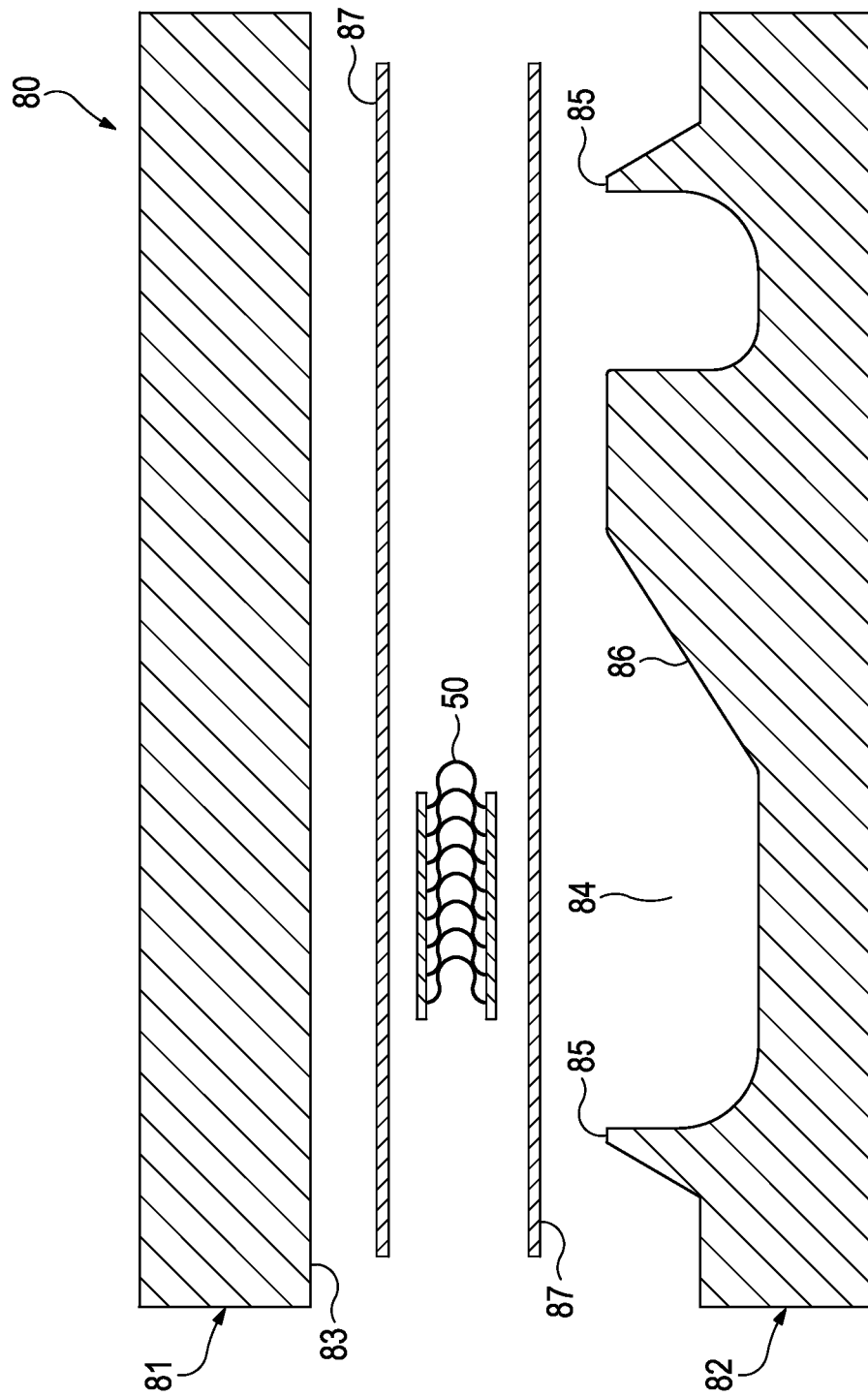
FIGS. 12A-12D are cross-sectional views of the molding portion of the manufacturing process, as defined along section line 12 in FIG. 10.
Figure 12B:
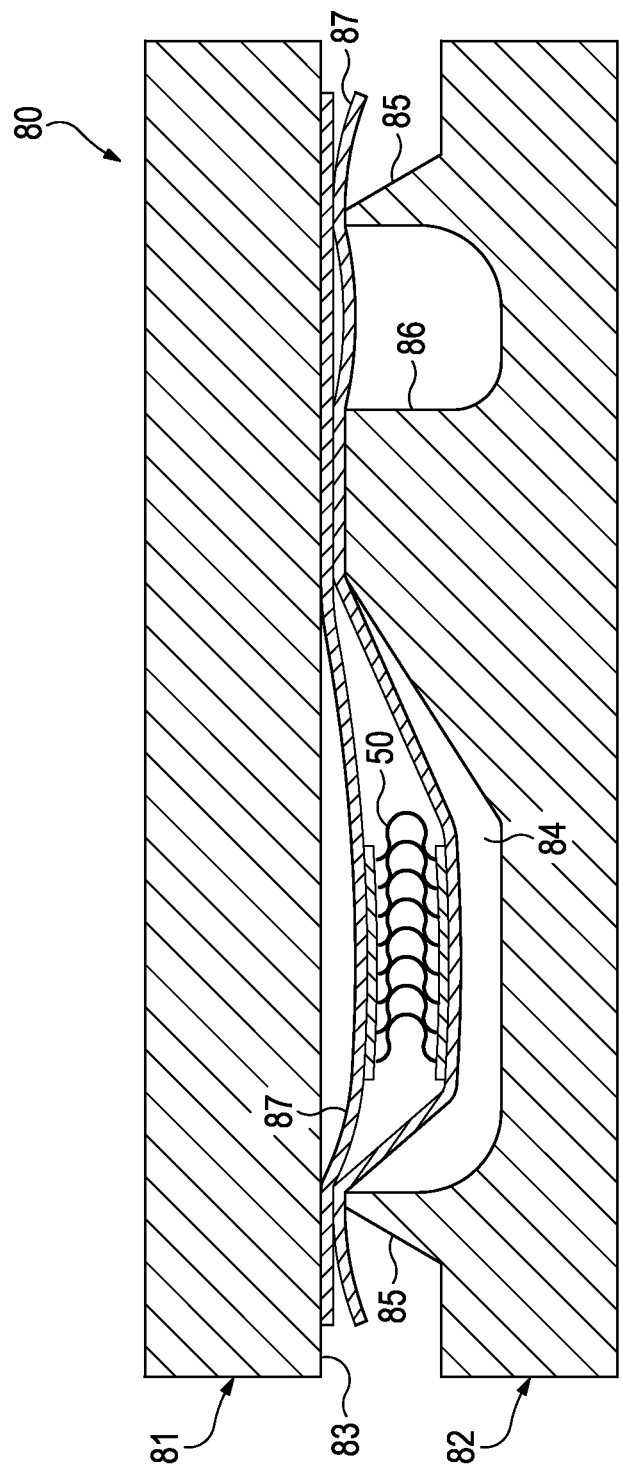

Following heating, polymer layers 87 are placed between mold portions 81 and 82, as depicted in FIG. 12A. Additionally, tensile member 50 is located between polymer layers 87. Note that connecting members 53 are collapsed at this point of the manufacturing process. Once the components of chamber 32 (i.e., polymer layers 87 and tensile member 50) are properly positioned relative to the contours of mold 80, mold portions 81 and 82 translate toward each other such that (a) surface 83 contacts one of polymer layers 87, (b) ridge 85 and protrusions 86 contact the other of polymer layers 87, and (c) portions of polymer layers 87 are compressed between surface 83 and each of ridge 85 and protrusions 86, as depicted in FIG. 12B.

As mold 80 contacts and compresses portions of polymer layers 87, a fluid (e.g., air) having a positive pressure in comparison with ambient air may be injected between polymer layers 87 to induce polymer layers 87 to contact and conform to the contours of mold 80. A variety of methods may be employed to pressurize the area between polymer layers 87. For example, the fluid may be directed through an area defined by the extension of ridge 85 that extends outward from depression 84. That is, an inflation needle may be placed between polymer layers 87 at a location of the extension of ridge 85 to deliver the fluid into the area between polymer layers 87 that forms barrier 40. Additionally, at least a partial vacuum may be formed on the exterior of polymer layers 87 to further induce polymer layers 87 to contact and conform to the contours of mold 80. For example, air may also be removed from the area between polymer layers 87 and mold 80 through various vents in mold portions 81 and 82.

Figure 12C:
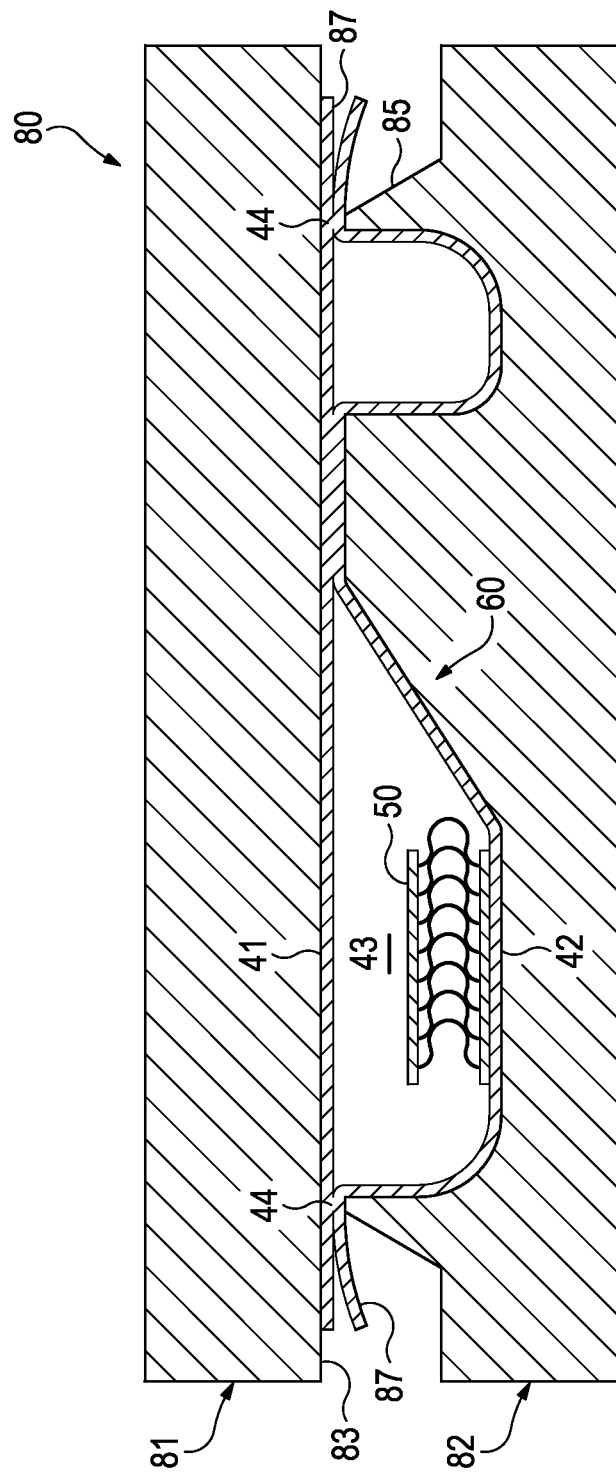

As the area between polymer layers 87 is pressurized and air is removed from the exterior of polymer layers 87, portions of polymer layers 87 conform to the shape of mold 80 and are bonded together, as depicted in FIG. 12C, thereby effectively shaping barrier portions 41 and 42 from polymer layers 87. More specifically, polymer layers 87 stretch, bend, or otherwise conform to extend along the surfaces of depression 84, ridge 85, and protrusions 86. Ridge 85 also compresses a linear area of polymer layers 87 to form peripheral bond 44. In addition, polymer layers 87 conform to the shapes of protrusions 86 and are bonded together by being compressed between protrusions 86 and surface 83, thereby forming stabilization structures 60 and 70. Note that tensile member 50 merely lays within the area between barrier portions 41 and 42 (i.e., within interior void 43) and is unbonded to barrier portions 41 and 42 at this stage of the manufacturing process.

Figure 12D:
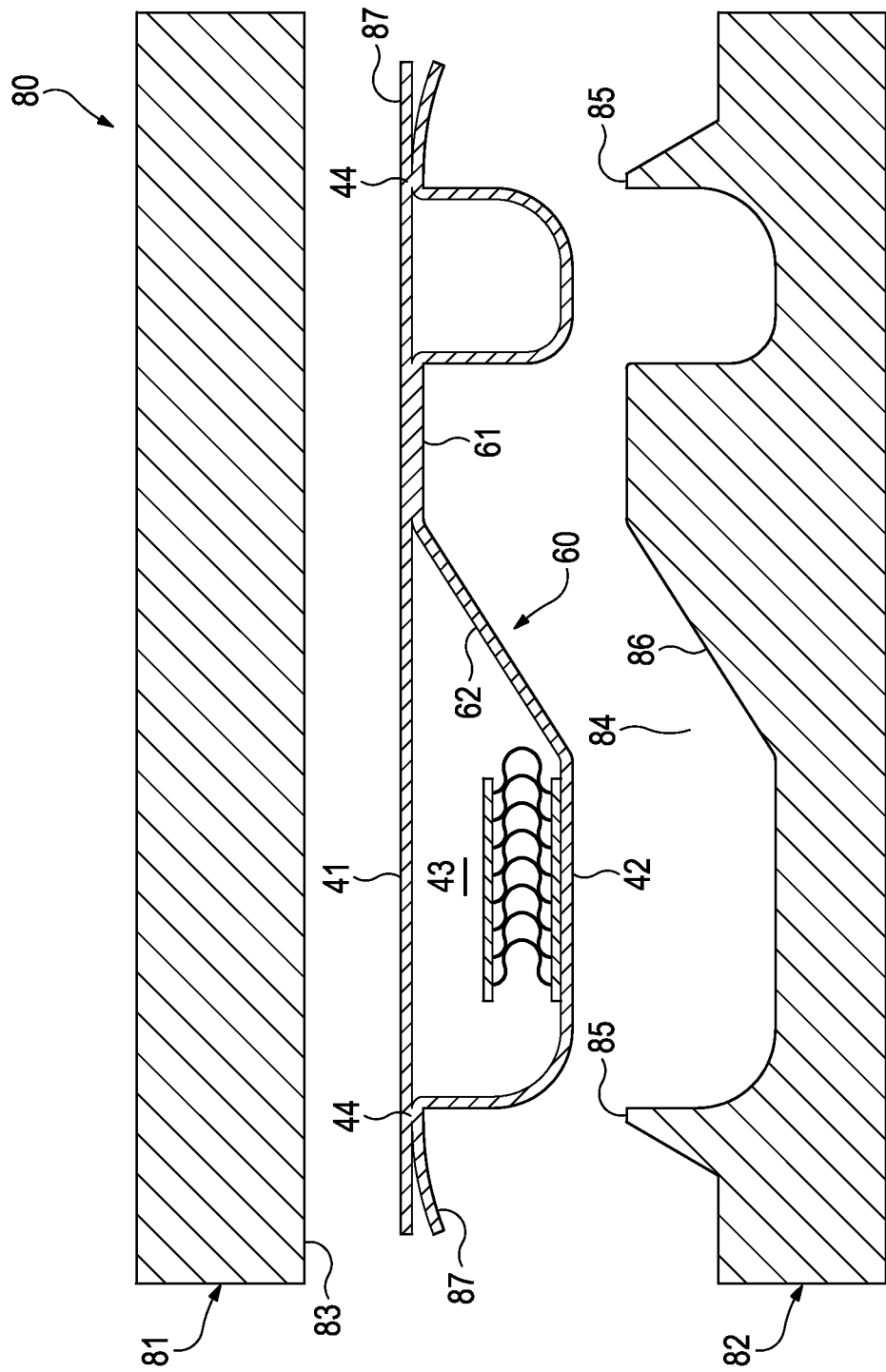
Figure 13:
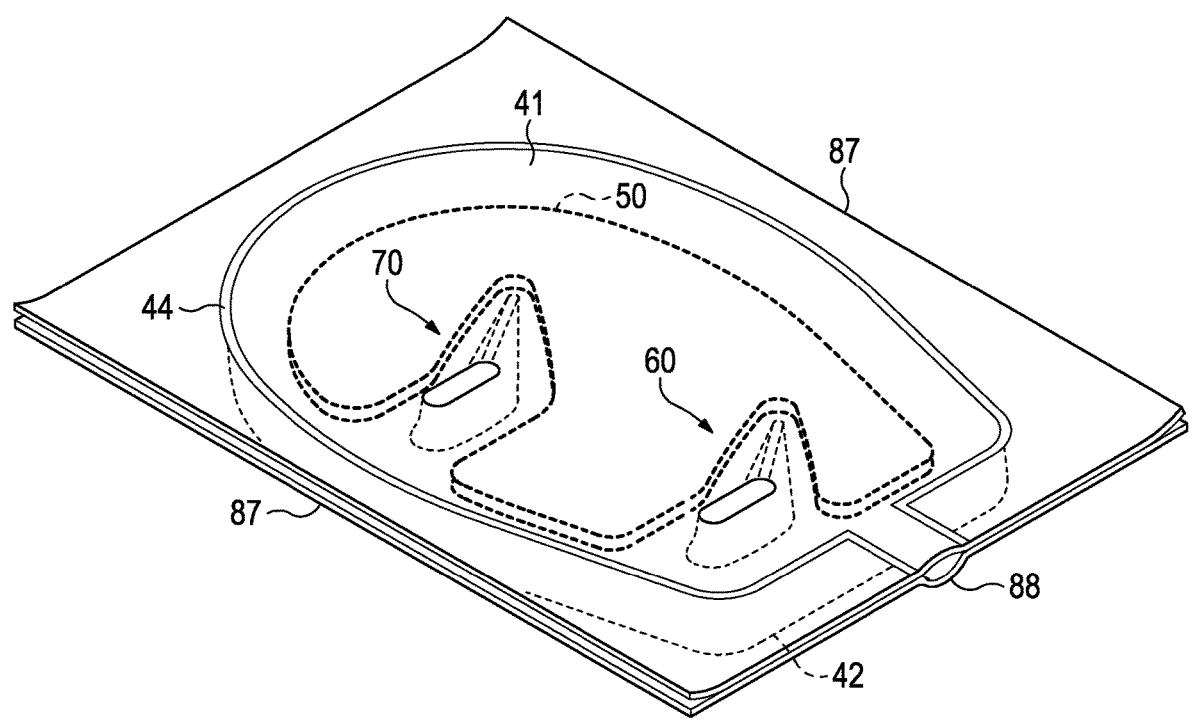
FIG. 13 is a perspective view of the chamber following the molding portion of the manufacturing process.

Once molding and bonding are complete, mold portions 81 and 82 separate such that the components of chamber 32 may be removed from mold 80, as depicted in FIG. 12D. Moreover, the components of chamber 32 following the molding portion of the manufacturing process are depicted in FIG. 13. In comparison with the finished configuration of chamber 32, the components of chamber 32 are not pressurized, tensile member 50 is unbonded to barrier portions 41 and 42, and excess portions of polymer layers 87 are present around peripheral bond 44 at this stage of the manufacturing process. In addition, the extension of ridge 85 has formed an inflation tube 88 in the excess portions of polymer layers 87.

Now that the molding portion of the manufacturing process is complete, the bonding portion is performed to secure tensile member 50 to each of barrier portions 41 and 42. Although tensile member 50 is unsecured to both of barrier portions 41 and 42 in this example, some manufacturing processes may bond or tack tensile member 50 to one of barrier portions 41 and 42 prior to or during the molding portion. At initial stages of the bonding portion of the manufacturing process, therefore, tensile member 50 is unbonded or otherwise unsecured to at least one of barrier portions 41 and 42.

Figure 14:
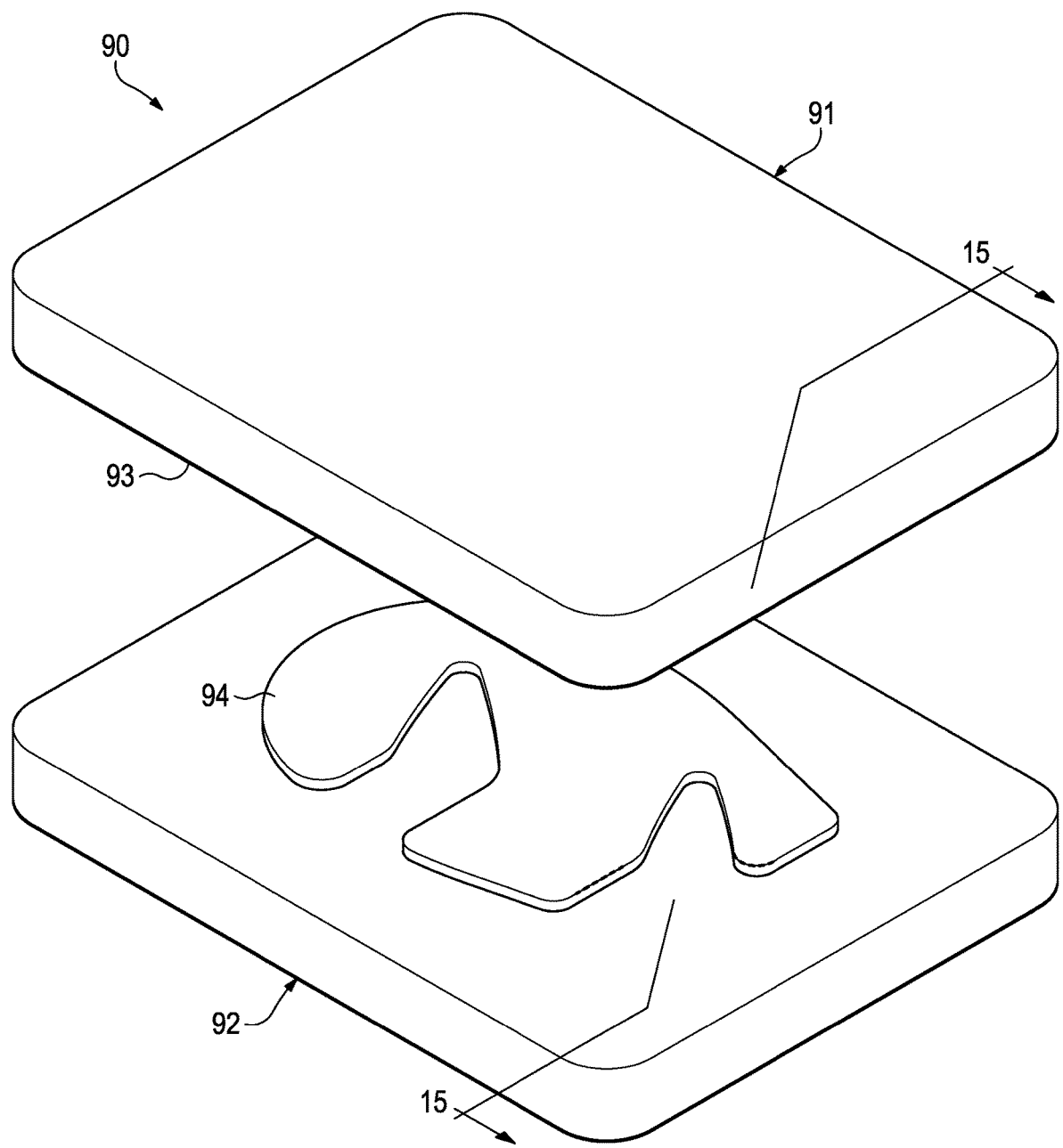
FIG. 14 is a perspective view of a bonding tool that may be utilized in a bonding portion of the manufacturing process for the chamber.

A bonding tool 90 is depicted in FIG. 14 as including a first portion 91 and a corresponding second portion 92. First portion 91 includes a surface 93 that is substantially planar and faces toward second portion 92, but may have various surface features in other configurations of bonding tool 90. Second portion 92 includes a raised bonding area 94 having the general shape of tensile member 50. In general, bonding tool 90 is a radio frequency bonding apparatus, and radio frequency energy passes between portions 91 and 92. At bonding area 94, however, the radio frequency energy has the capacity to heat or melt the polymer material forming barrier 40.

Figure 15A:
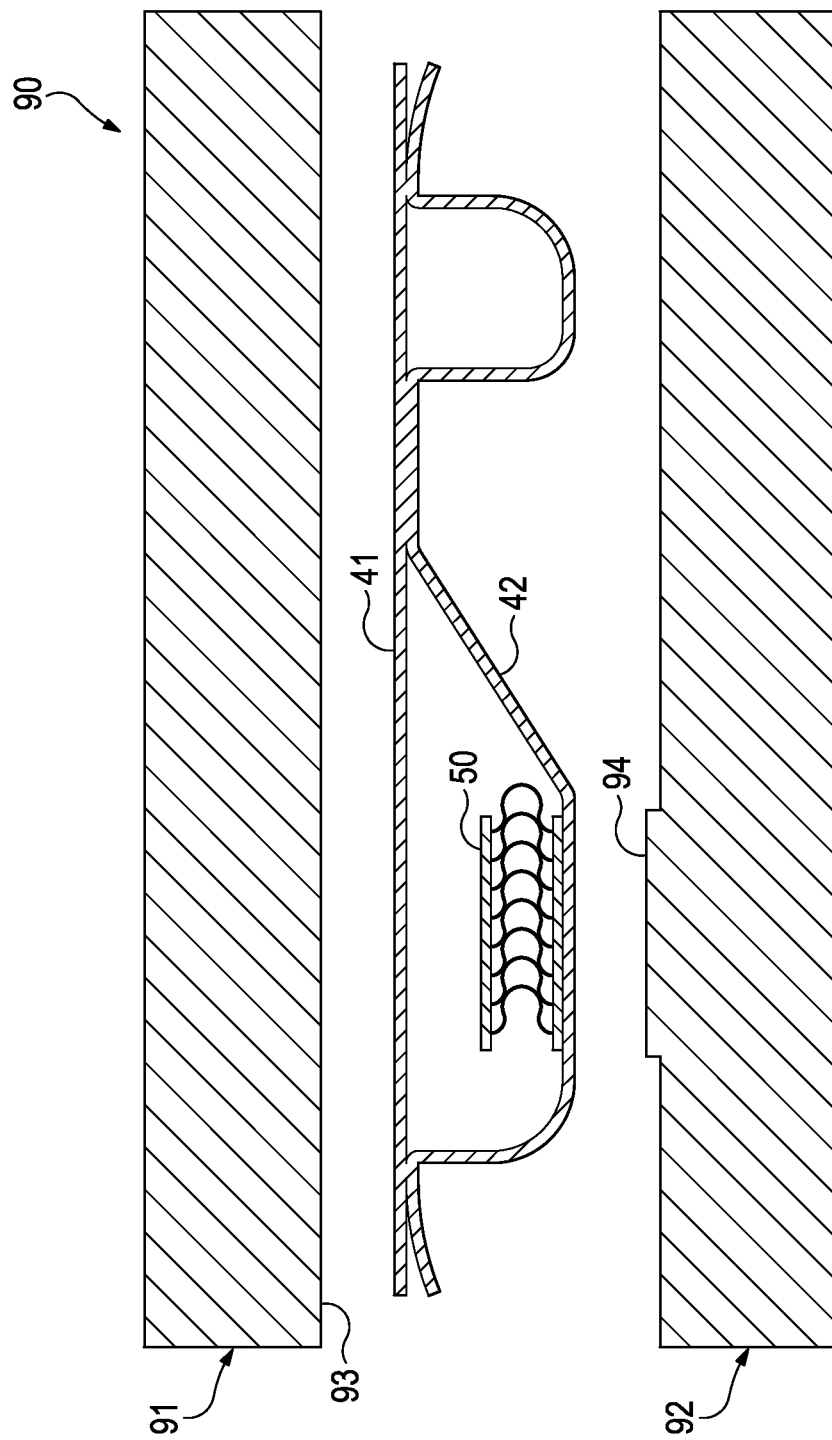
FIGS. 15A-15C are cross-sectional views of the bonding portion of the manufacturing process, as defined by section line 14 in FIG. 13.
Figure 15B:
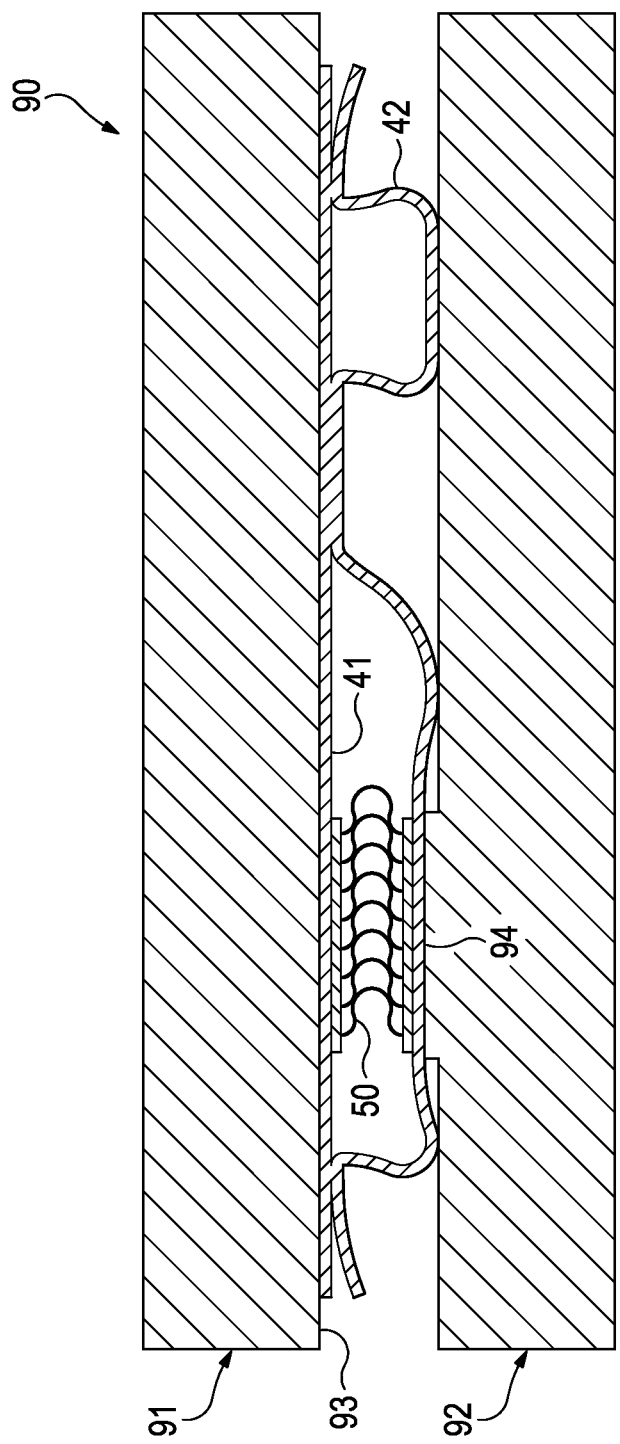
Figure 15C:
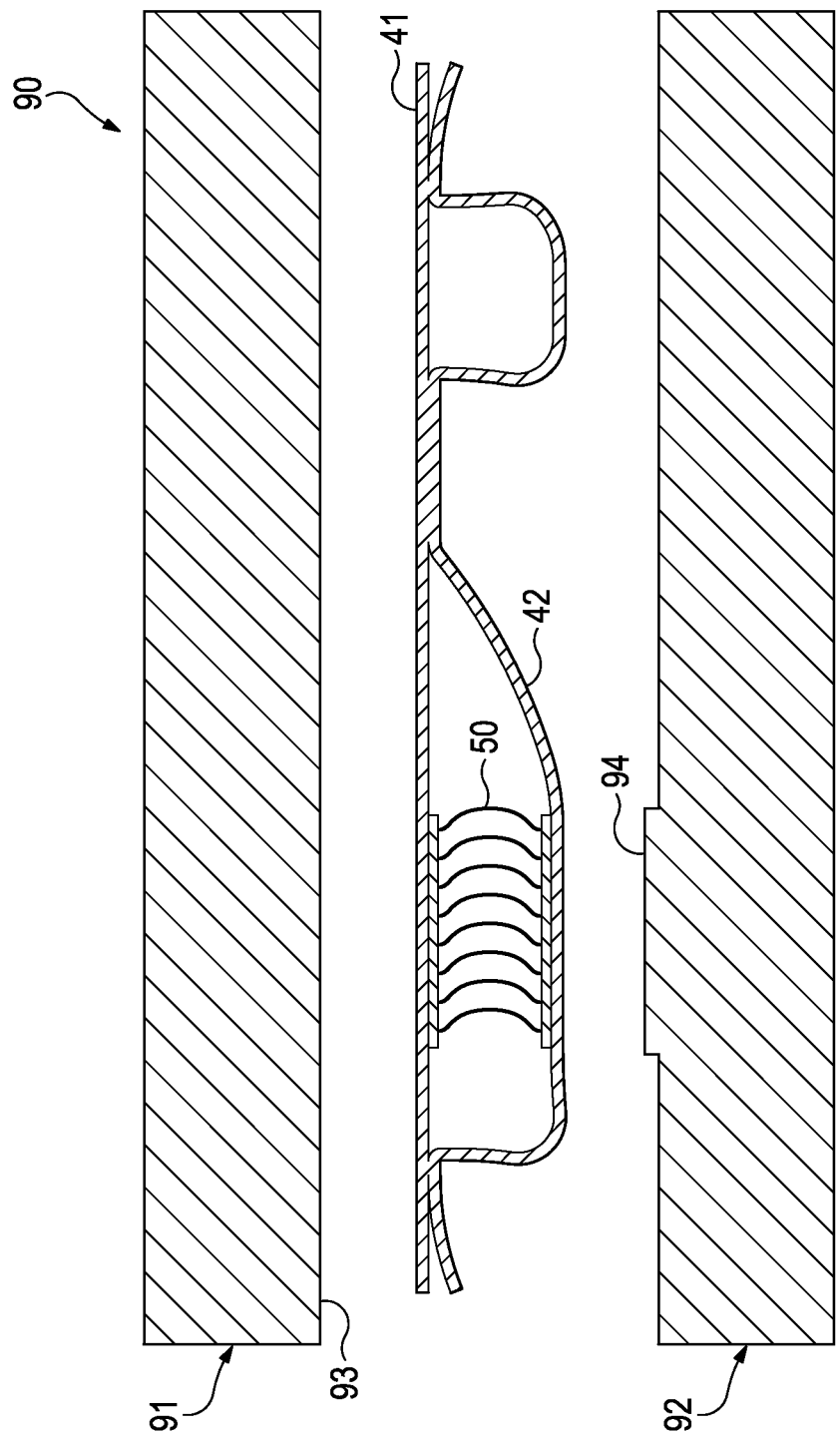

The manner in which bonding tool 90 is utilized to bond tensile member 50 to barrier 40 will now be discussed. Initially, the components of chamber 32 formed during the molding portion of the manufacturing process are located between portions 91 and 92, as depicted in FIG. 15A. Once the components of chamber 32 are properly positioned relative to bonding tool 90, portions 91 and 92 translate toward each other and compress barrier portions 41 and 42 against tensile member 50, as depicted in FIG. 15B. Bonding tool 90 is now activated and radio frequency energy passes between surface 93 and bonding area 94. Moreover, the radio frequency energy at bonding area 94 has sufficient energy to raise the temperature of barrier portions 41 and 42 to at least the glass transition temperature of the polymer material forming barrier portions 41 and 42. Once sufficiently heated, the polymer material forming barrier portions 41 and 42 bond with tensile member 50. In effect, a combination of compression and heating is utilized to bond tensile member 50 to barrier 40. It should be noted that because bonding area 94 has the general shape of tensile member 50, areas of the first barrier portion and the second barrier portion that are immediately adjacent to the tensile member are heated, while other areas may be unheated or only heated to a minimal degree. After bonding is complete, portions 91 and 92 separate such that the components of chamber 32 may be removed from bonding tool 90, as depicted in FIG. 15C. Note that tensile member 50 is secured to barrier portions 41 and 42. Although tensile member 50 is bonded, connecting members 53 may remain somewhat collapsed at this stage of the manufacturing process.

In order to facilitate bonding between barrier 40 and tensile member 50, polymer bonding layers (not depicted) may be applied to each of layers 51 and 52. When heated, the bonding layers soften, melt, or otherwise begin to change state so that contact with barrier portions 41 and 42 induces material from each of barrier 40 and the bonding layers to intermingle or otherwise join with each other. Upon cooling, the bonding layers are permanently joined with barrier 40, thereby joining barrier 40 and tensile member 50. In some configurations, thermoplastic threads or strips may be present within layers 51 and 52 to facilitate bonding with barrier 40, as disclosed in U.S. Pat. No. 7,070,845, which was mentioned above and is incorporated herein by reference. An adhesive may also be utilized to assist with securing barrier 40 and tensile member 50.

Figure 16:
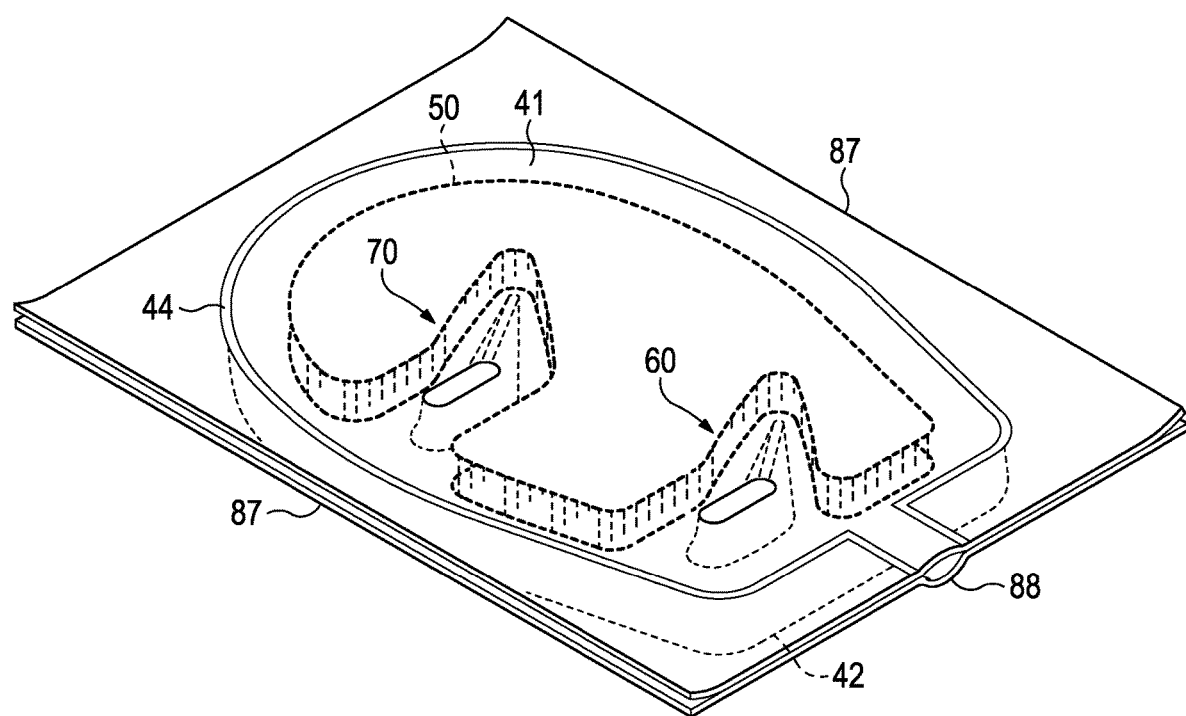
FIG. 16 is a perspective view of the chamber following the bonding portion of the manufacturing process.

The components of chamber 32 following the bonding portion of the manufacturing process are depicted in FIG. 16. In comparison with the finished configuration of chamber 32, the components of chamber 32 are not pressurized and excess portions of polymer layers 87 are present around peripheral bond 44 at this stage of the manufacturing process. The components of chamber 32 are permitted to cool, and a pressurized fluid is injected through the conduit formed by inflation tube 88, thereby extending connecting members 53 and placing connecting members 53 in tension. Inflation tube 88 is then sealed to enclose the fluid within barrier 40. In addition, the excess portions of polymer layers 87 may be trimmed or otherwise removed from chamber 32 and then recycled or reutilized to form additional polymer layers or components. Upon inflation and trimming, the manufacturing process of chamber 32 is substantially complete.

Further Configurations

The configuration of chamber 32 discussed above provides an example of a suitable configuration for numerous footwear applications, as well as for various other products. Chamber 32 or other chambers incorporating stabilization structures may, however, have a variety of other configurations or features. The following discussion presents various configurations of chamber 32 with varying features. Depending upon the specific properties desired for particular applications, any of these features may be utilized individually or in combination.

Figure 17A:
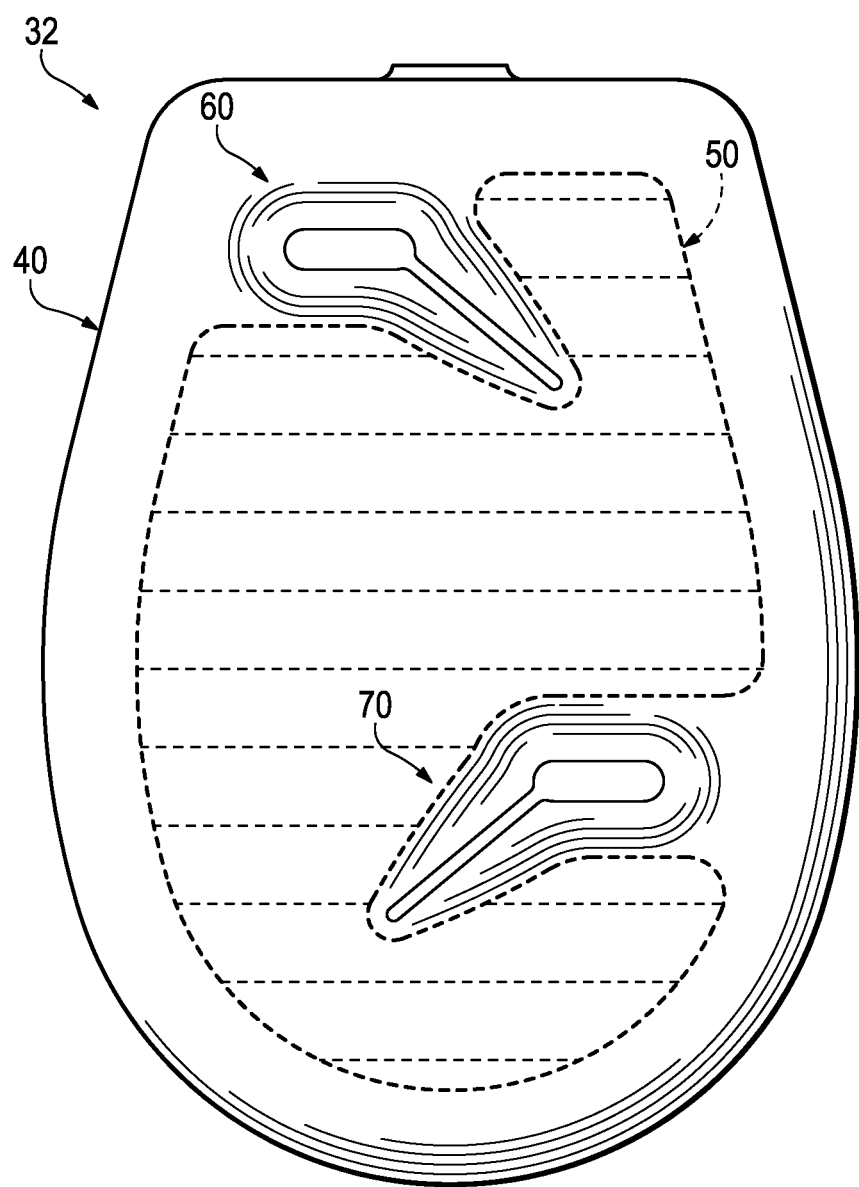
FIGS. 17A-17P are bottom plan views corresponding with FIG. 7 and depicting further configurations of the chamber.
Figure 17B:
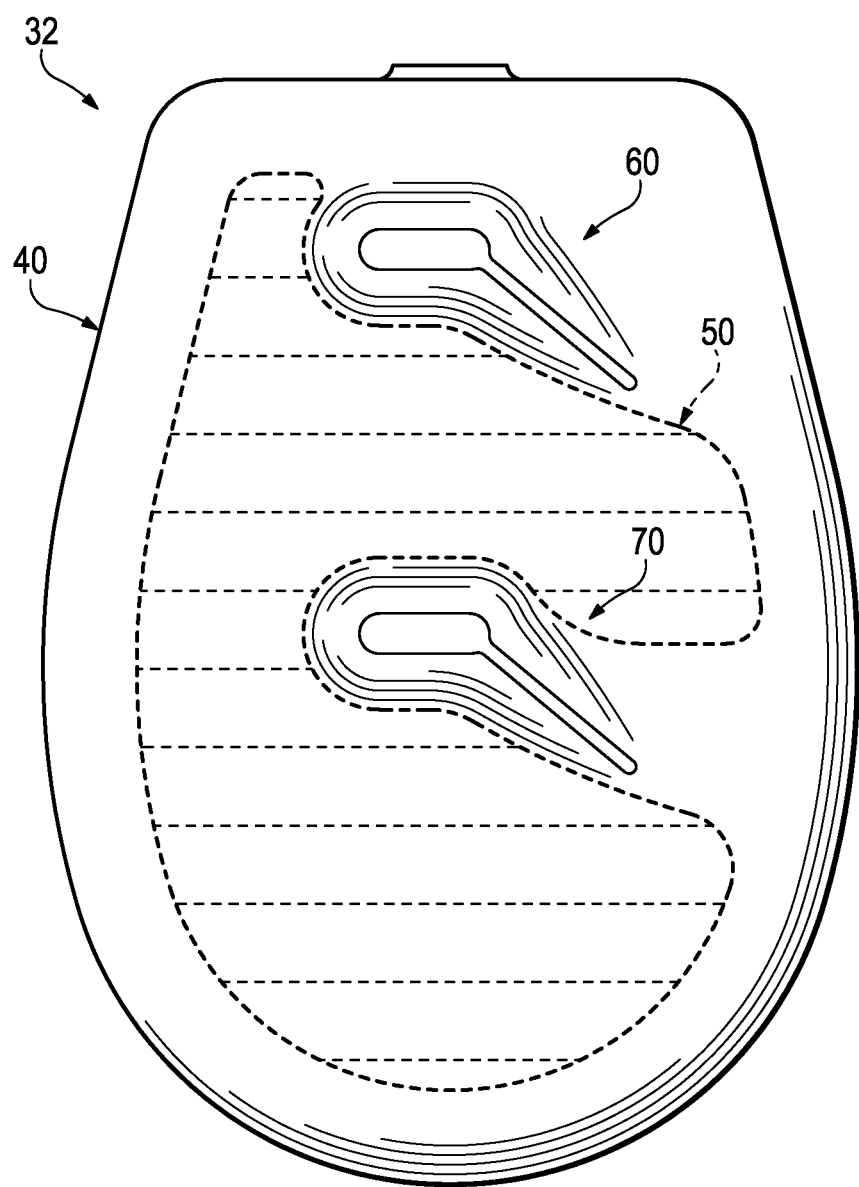
Figure 17C:
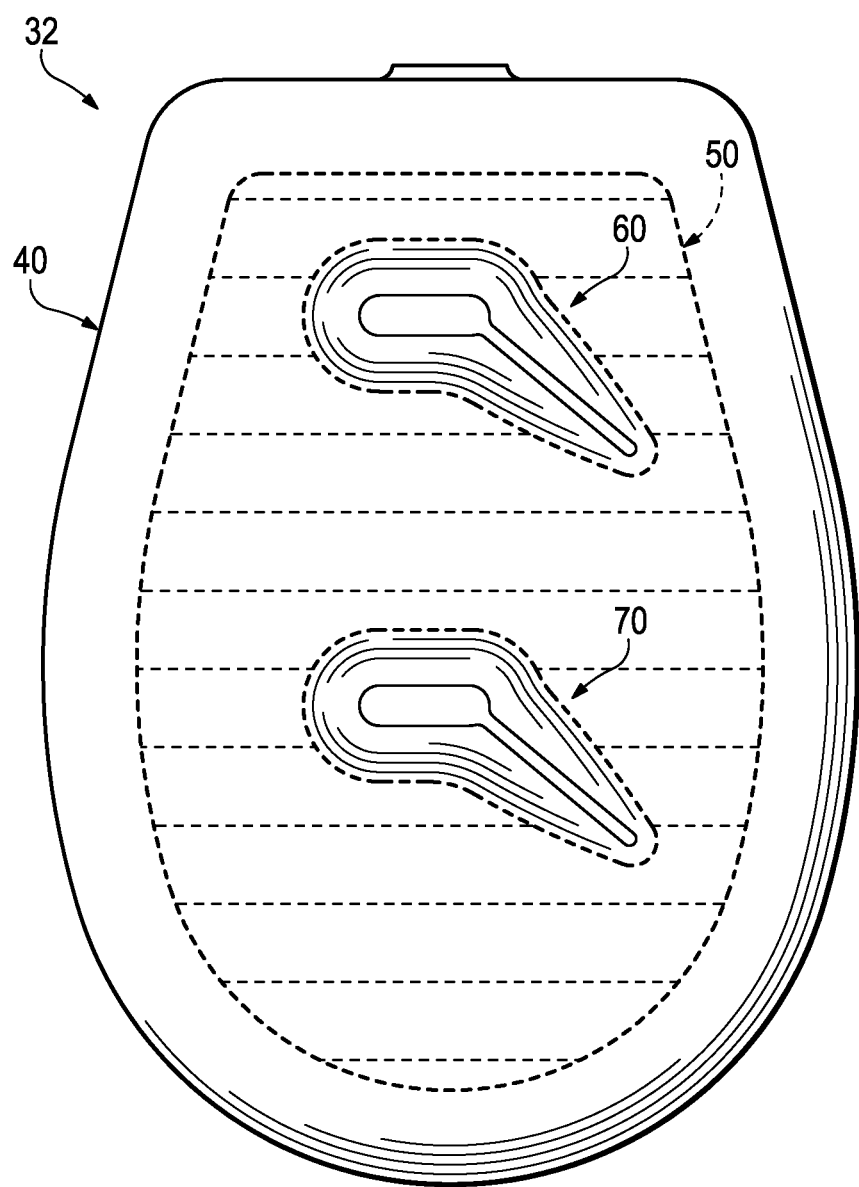

FIG. 17A depicts a configuration of chamber 32 wherein stabilization structures 60 and 70 are formed in opposite areas of barrier 40, and folds 62 and 72 extend in different directions. The positions of stabilization structures 60 and 70 may also vary, as in FIG. 17B, wherein interior bonds 61 and 71 are centrally-positioned in chamber 32. Although peripheral edge 54 of tensile member 50 may form indentations in the areas of stabilization structures 60 and 70, tensile member 50 may also form apertures in the areas of stabilization structures 60 and 70, as depicted in FIG. 17C.

Figure 17D:
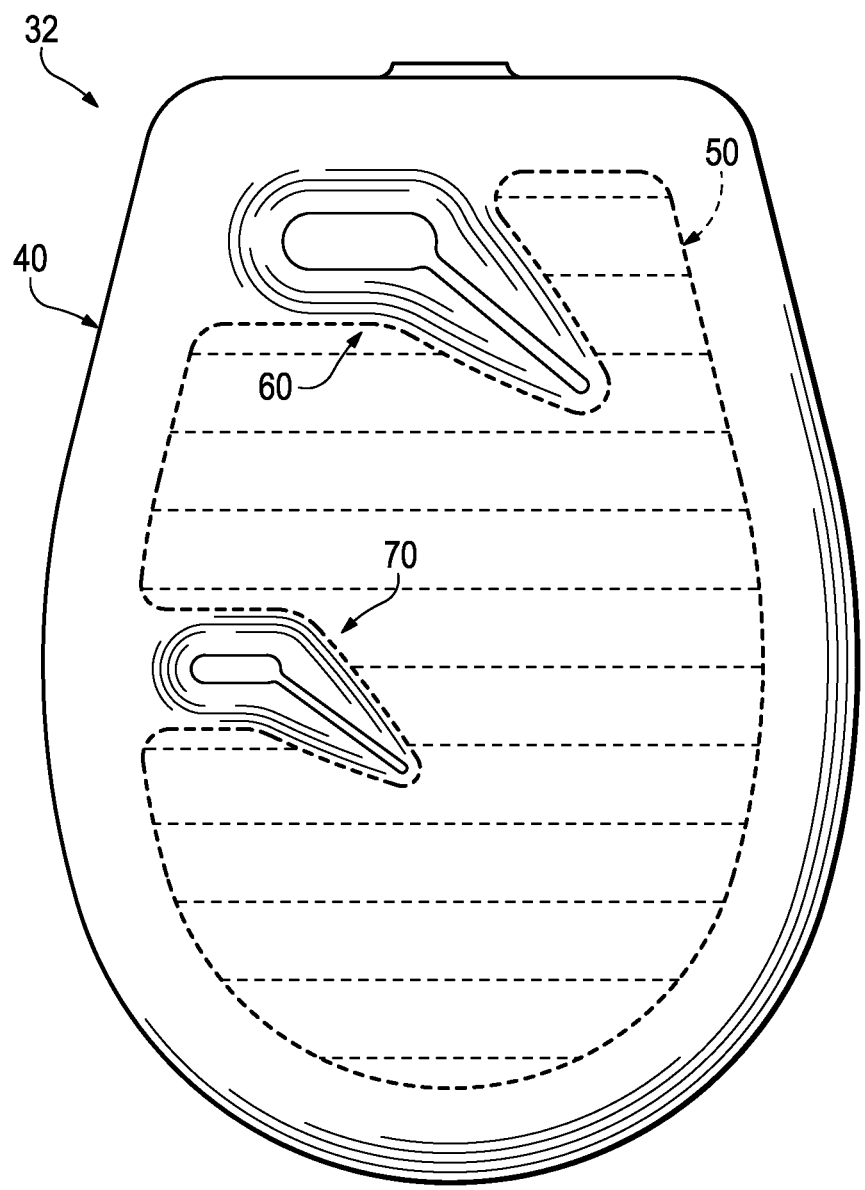
Figure 17E:
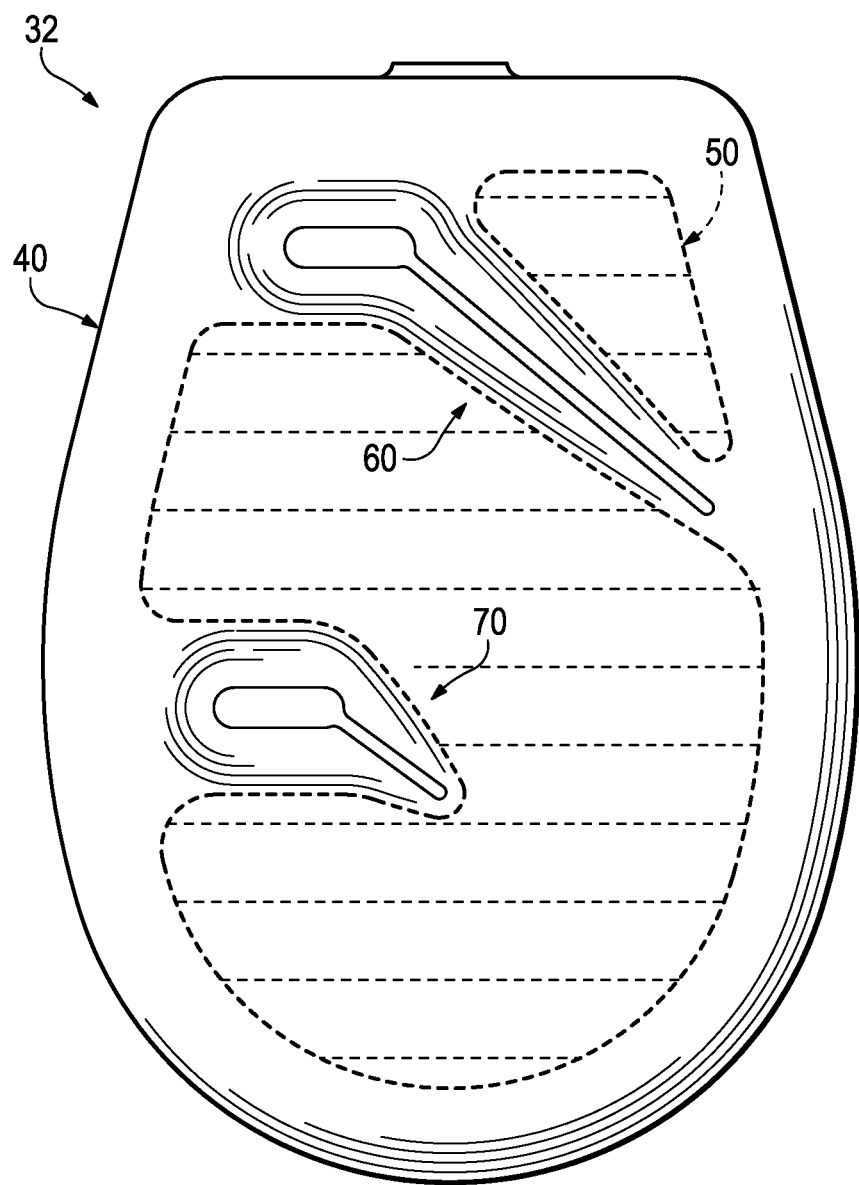
Figure 17F:
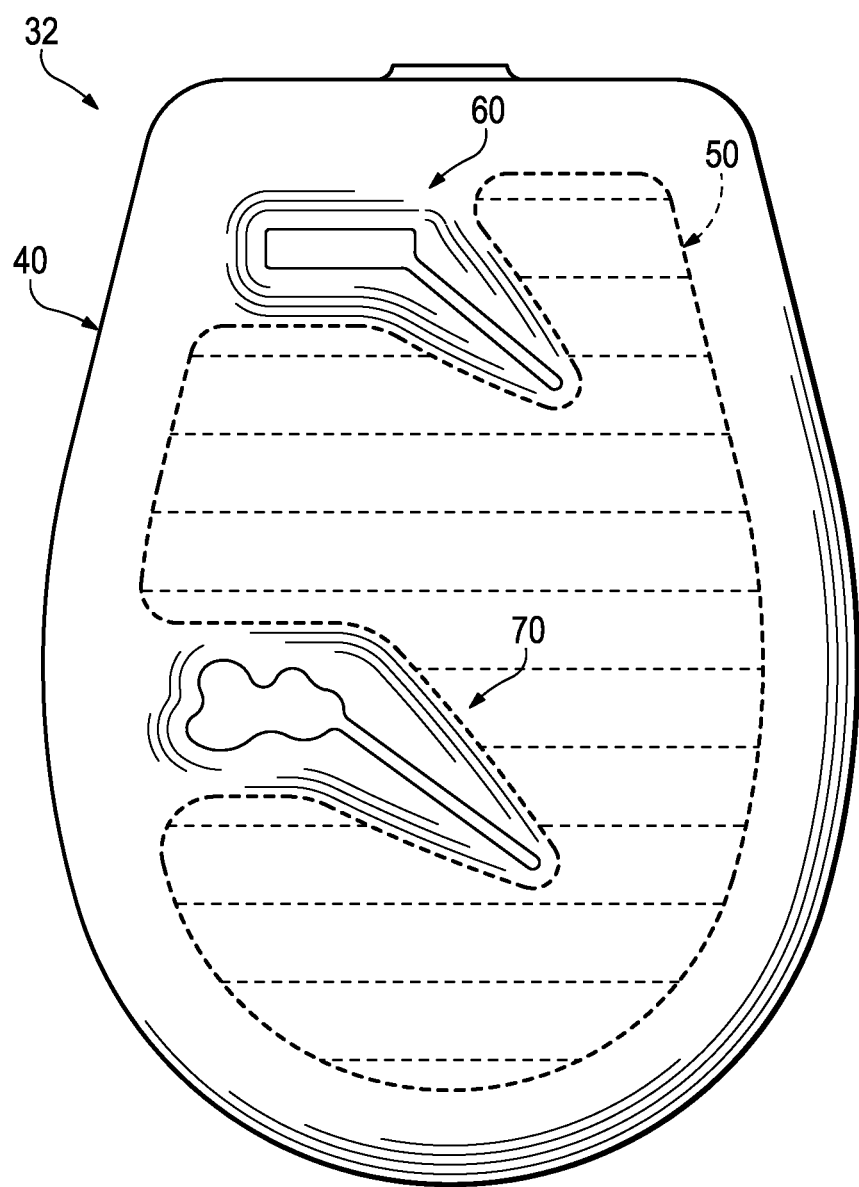
Figure 17G:
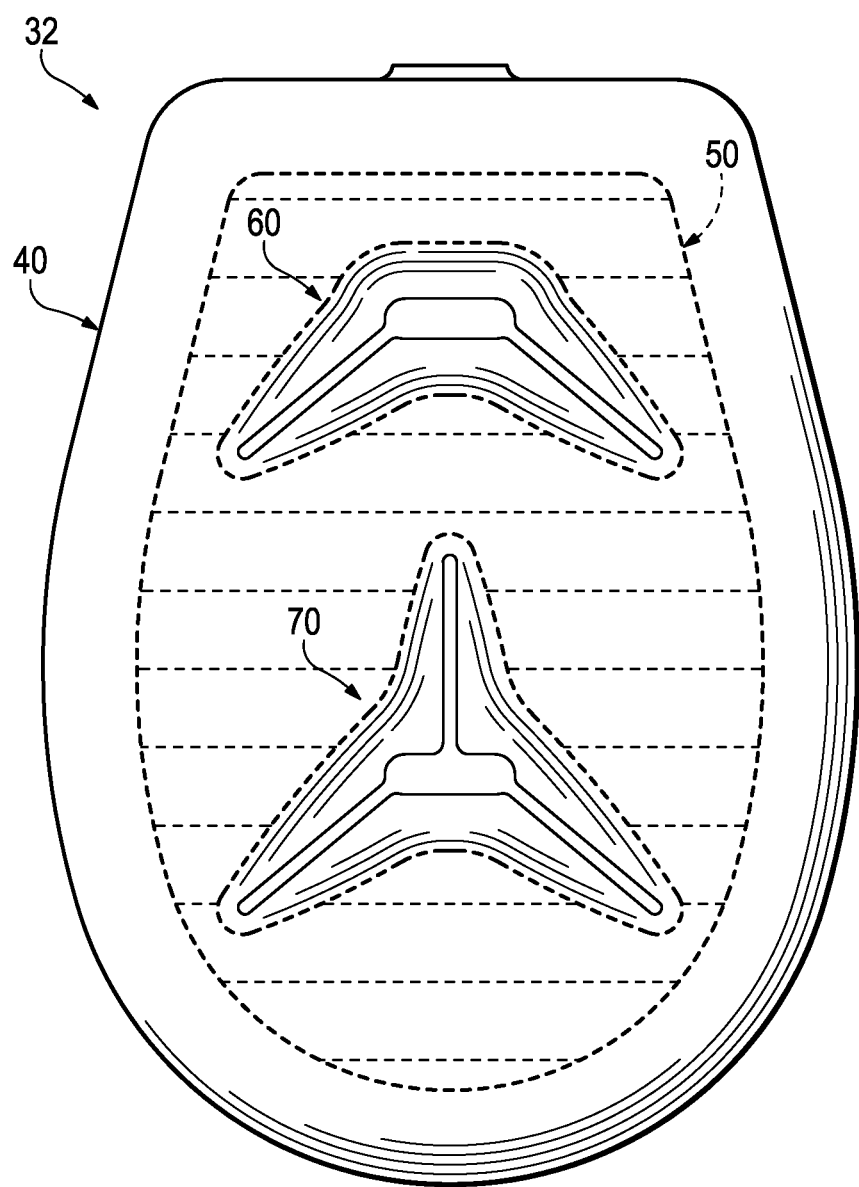

The sizes of portions of stability structures 60 and 70 may also vary. As examples, FIG. 17D depicts interior bonds 61 and 71 as having different sizes, and FIG. 17E depicts folds 62 and 72 as having different lengths. Referring to FIG. 17F, interior bonds 61 and 71 may also have different shapes. Although each of stabilization structures 60 and 70 may have a single fold 62 or 72, stabilization structures 60 and 70 may also have multiple folds 62 and 72. For example, FIG. 17G depicts stabilization structure 60 as having two folds 62, and stabilization structure 70 as having three folds 72. Also note that tensile member 50 includes individual portions that are separated from each other by one or both of stabilization structures 60 and 70.

Figure 17H:
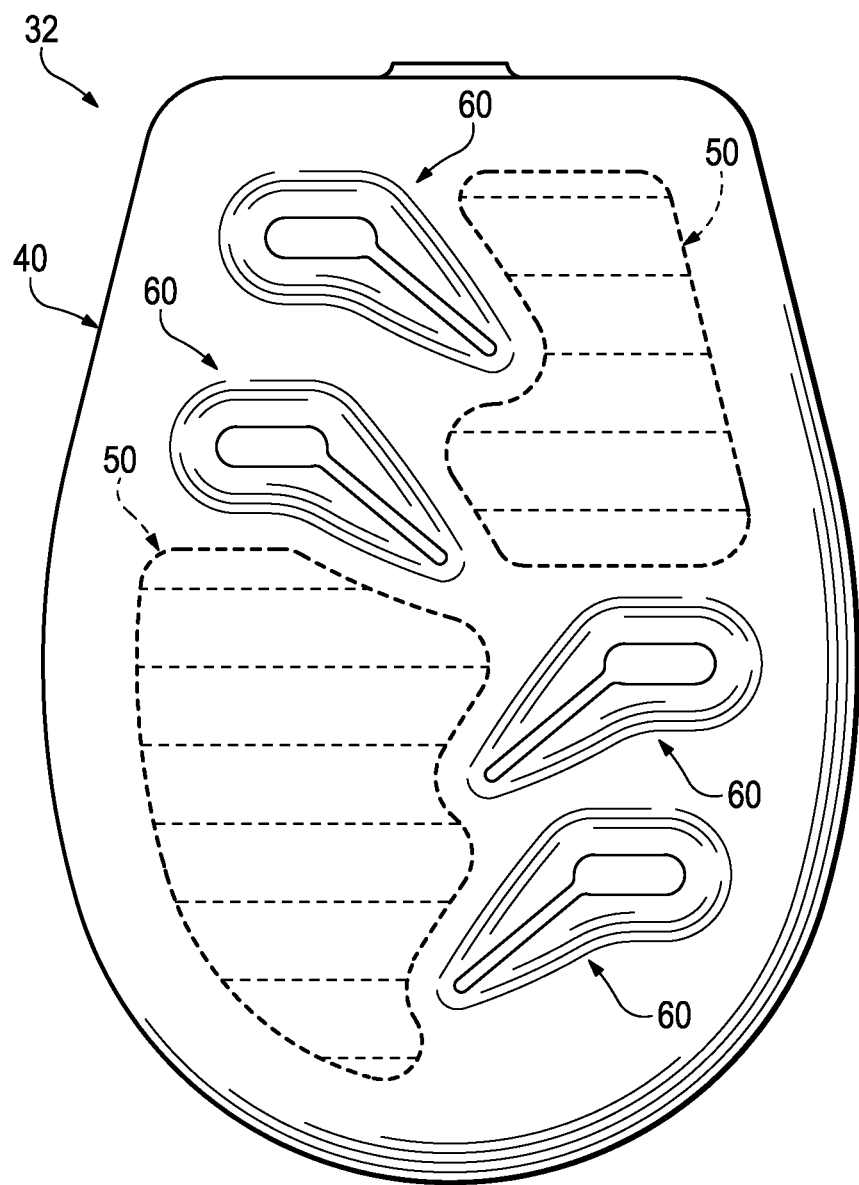
Figure 17I:
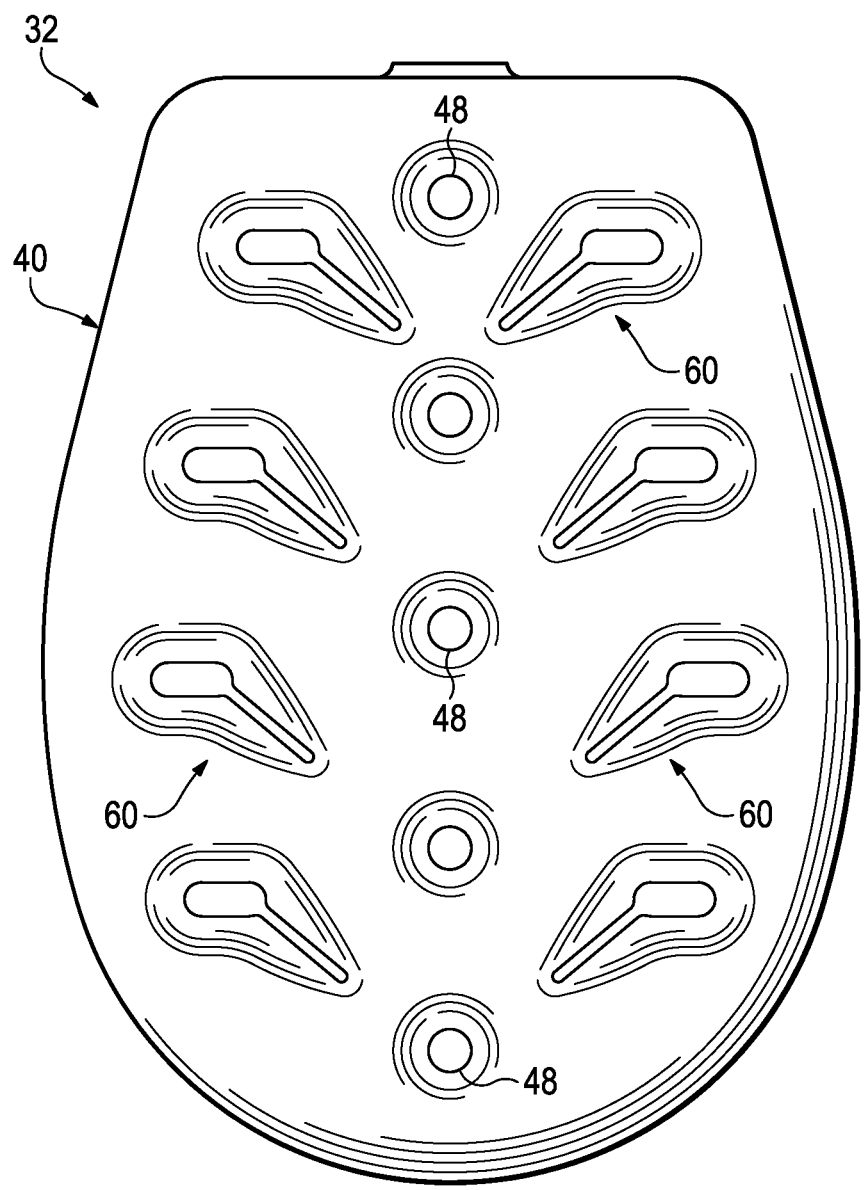
Figure 17J:
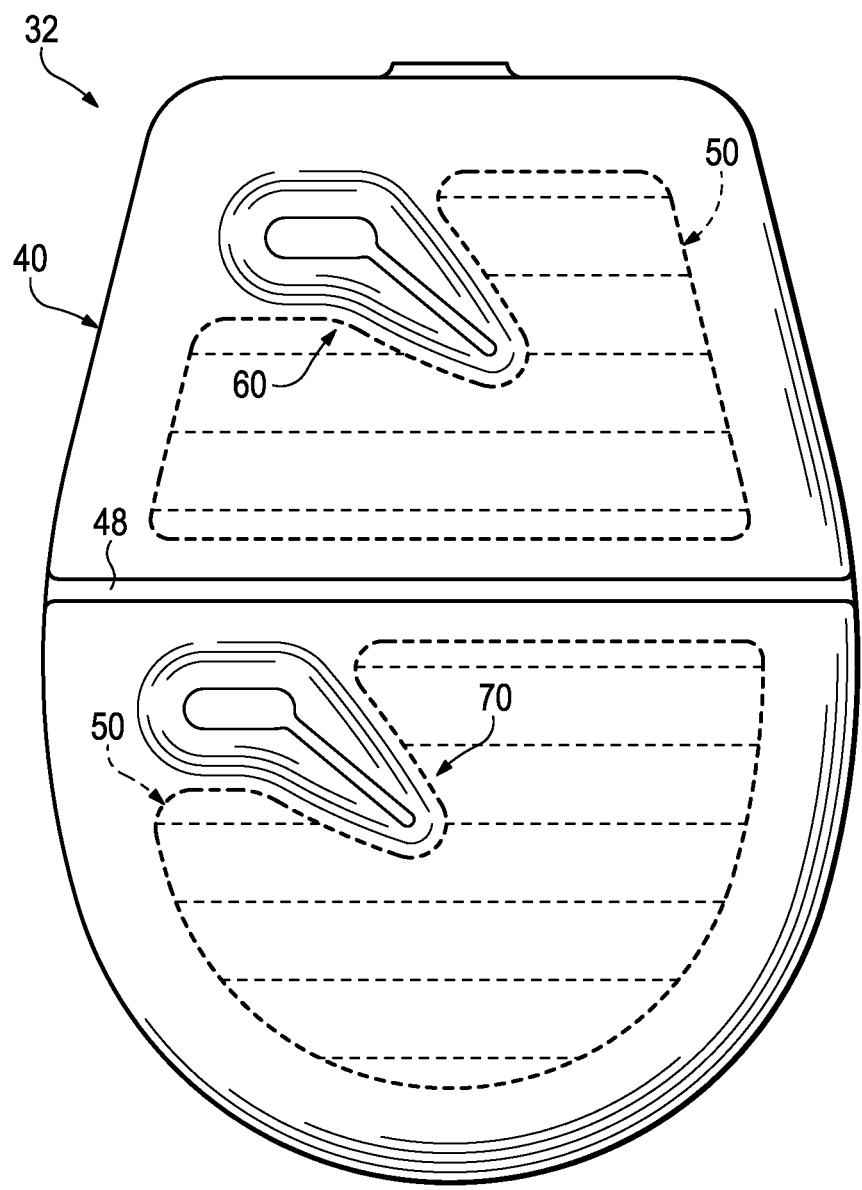
Figure 17K:
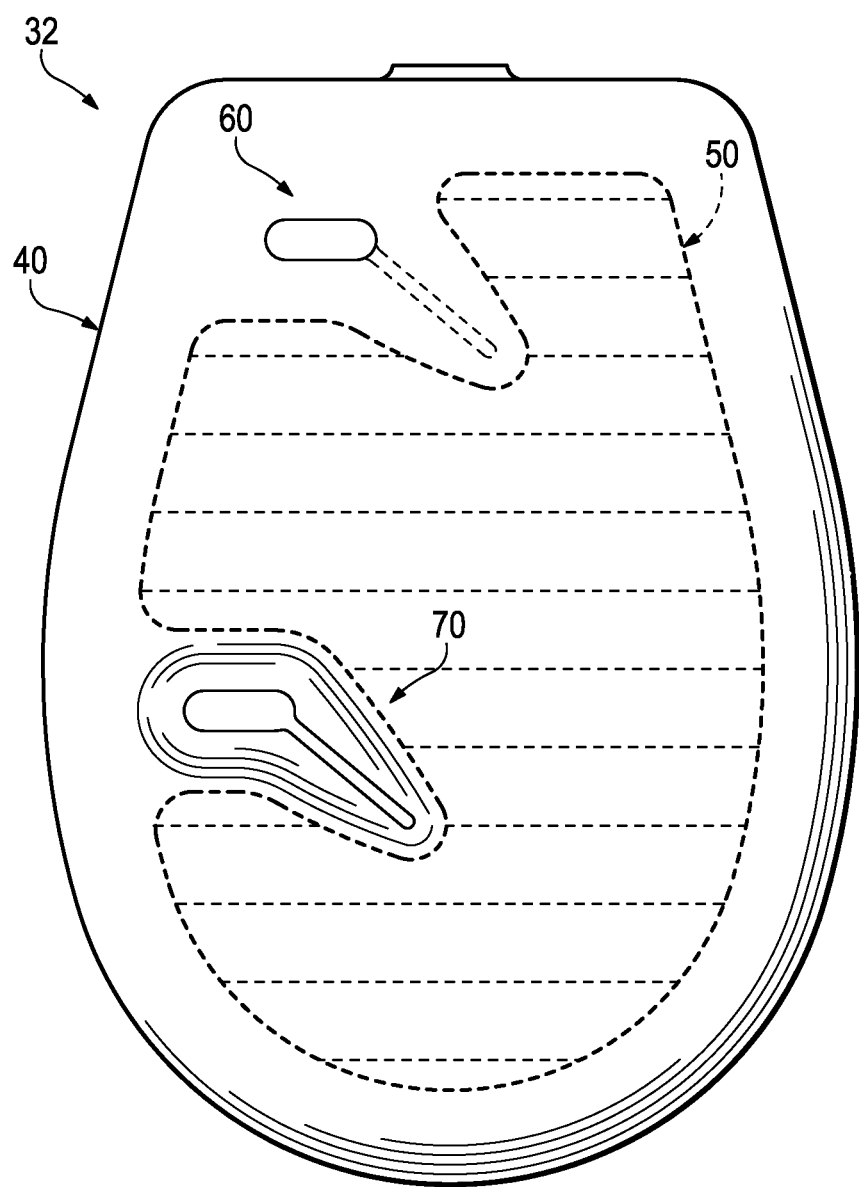
Figure 17L:
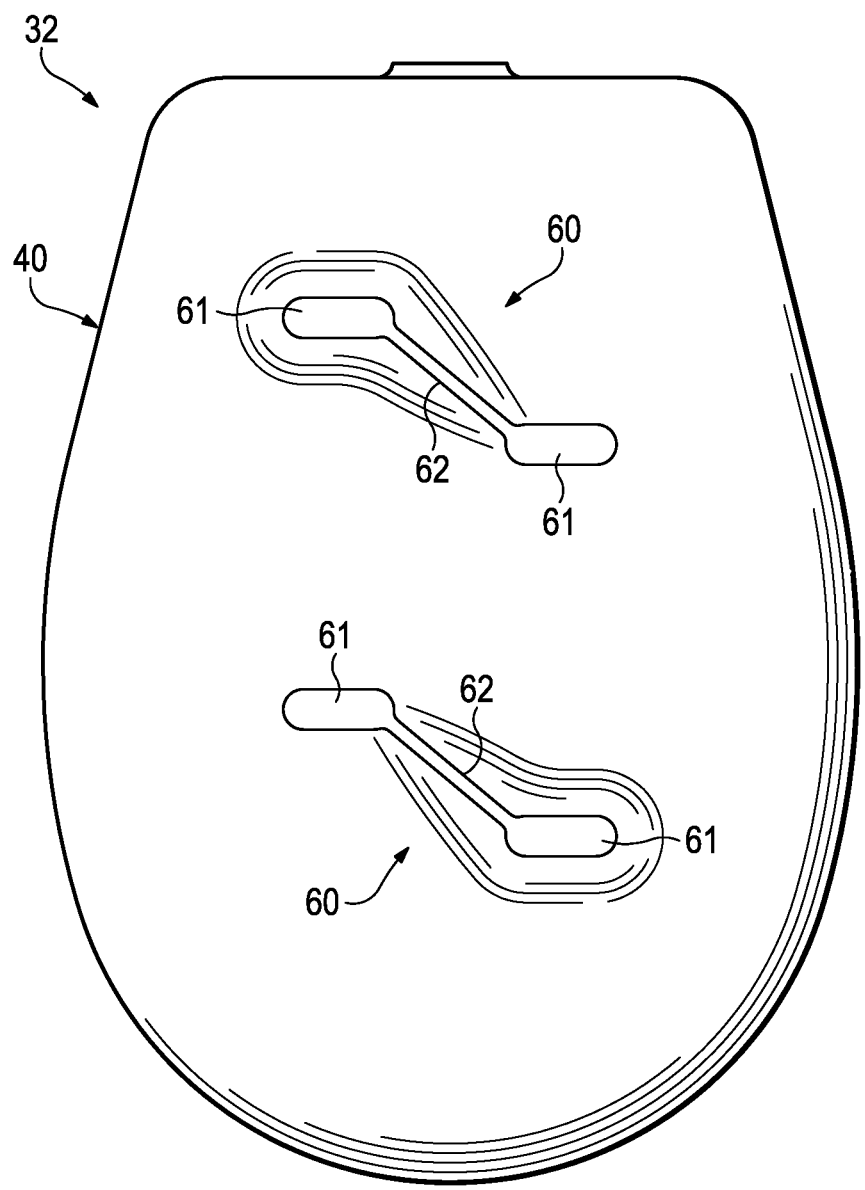

The number of stabilization structures 60 and 70 may also vary. As an example, FIG. 17H depicts chamber 32 as including four stabilization structures 60. As another example, FIG. 17I depicts chamber 32 as including eight stabilization structures 60, as well as various bonds 48. In this configuration, tensile member 50 may be absent since interior bonds 61 and bonds 48 may be sufficient to retain an intended shape of chamber 32. In another configuration, as depicted in FIG. 17J a bond 48 may also be utilized to divide chamber 32 into two separate subchambers, with each of the subchambers being inflated to different pressures. As a further variation, FIG. 17K depicts stabilization structure 60 as being formed in upper barrier portion 41 and stabilization structure 70 as being formed in lower barrier portion 42. As another variation, FIG. 17L depicts each fold 62 as extending between two interior bonds 61 that are located on opposite sides of chamber 32. That is one of the interior bonds 61 for each stabilization structure 60 is located at the first plane of first surface 45, and the other of the interior bonds 61 for each stabilization structure 60 is located at the second plane of second surface 46. Details on a configuration that is similar to FIG. 17L may be found with reference to a discussion below for FIG. 18C.

Figure 17M:
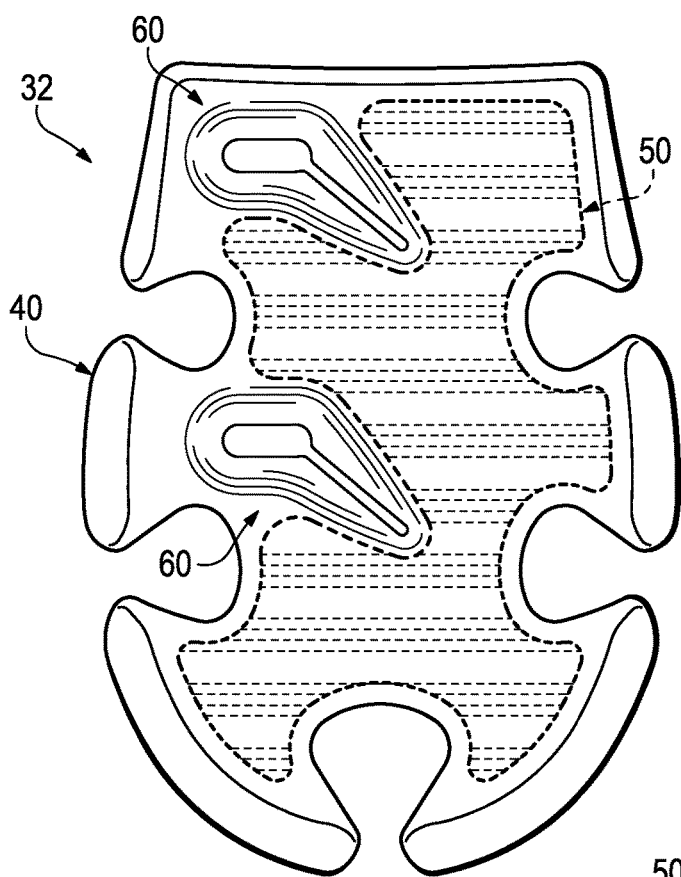
Figure 17N:
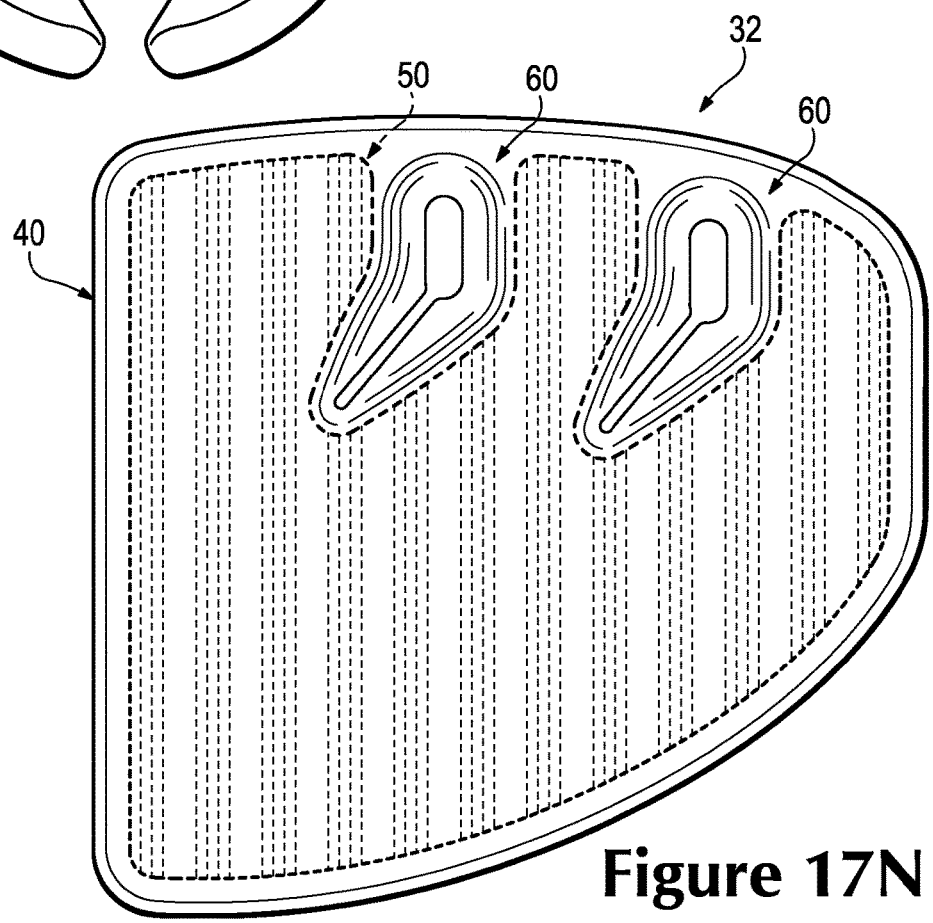
Figure 17O:
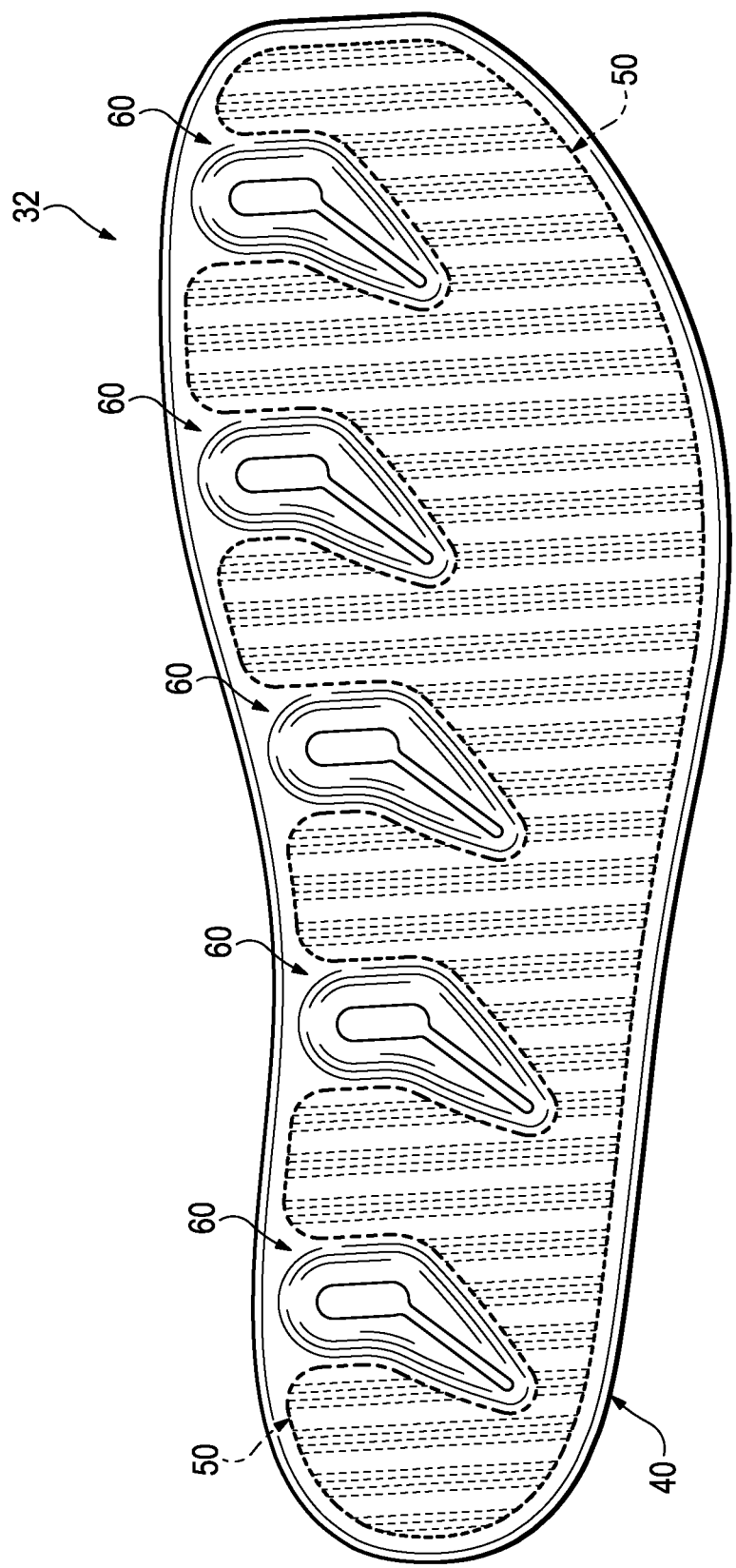
Figure 17P:
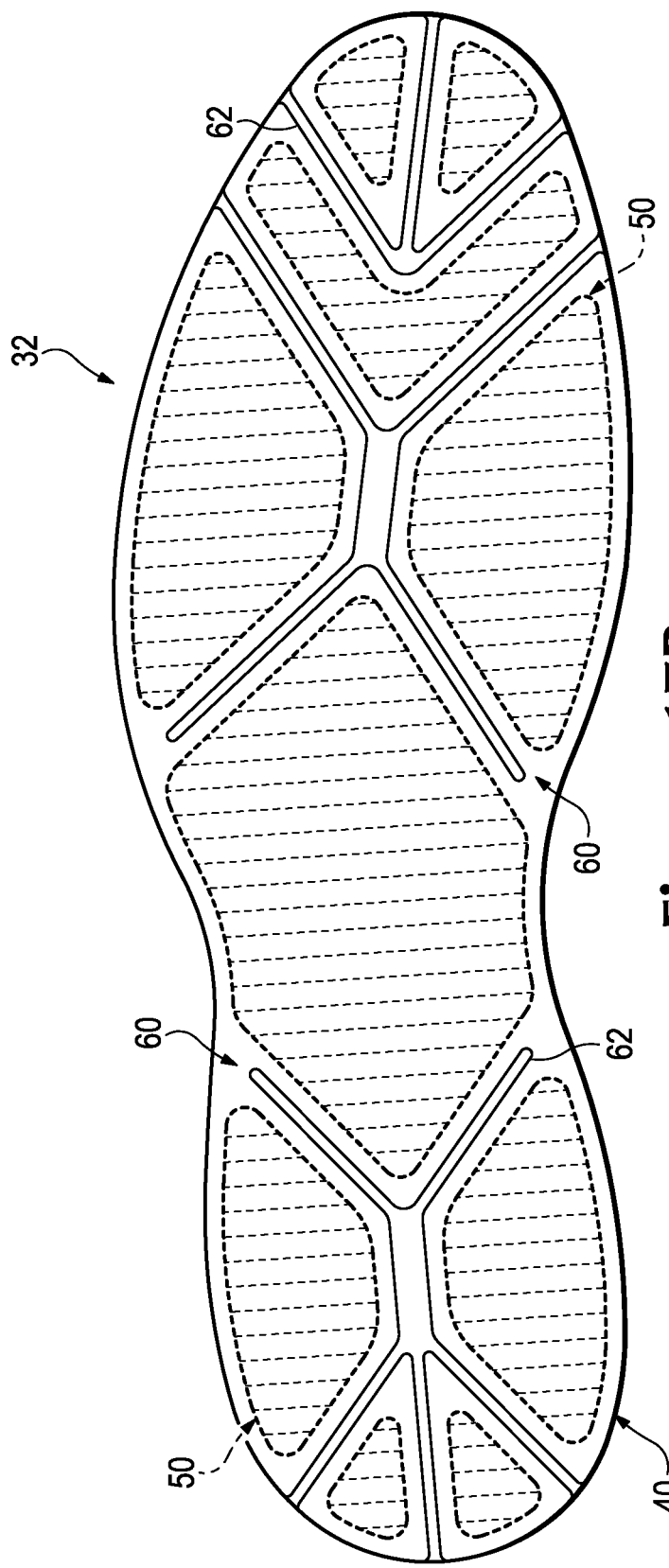

The overall shape of chamber 32 and the areas of footwear 10 in which chamber 32 is located may also vary. Referring to FIG. 17M, peripheral areas of chamber 32 includes various lobes separated by spaces. The configuration of FIG. 17N may be appropriate for use in forefoot region 11 of footwear 10. Additionally, FIG. 17O depicts a configuration of chamber 32 that may extend through each of regions 11-13 and between sides 14 and 15, thereby extending under substantially all of the foot. Referring to FIG. 17P, chamber 32 includes various features discussed above, including a full-foot configuration, centrally-located interior bonds 61, multiple folds 62 extending from individual bonds 61, folds 62 extending in different directions, and individual portions of tensile member 50. Moreover, folds 62 extend to a periphery of chamber 32.

Figure 18A:
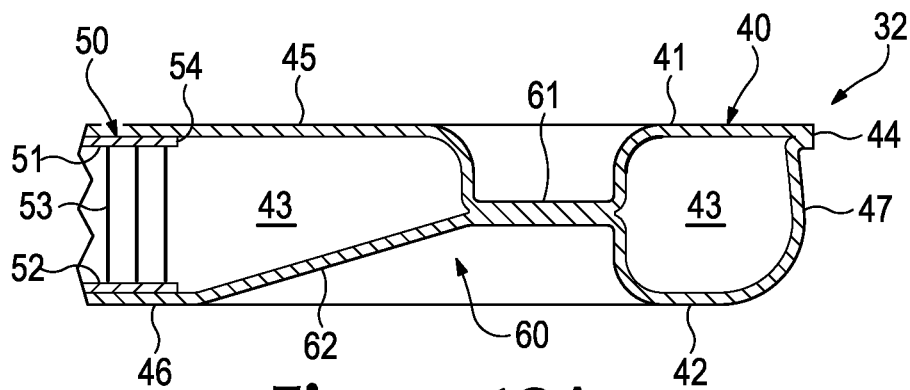
FIGS. 18A-18D are cross-sectional views corresponding with FIG. 9A and depicting further configurations of the chamber.
Figure 18B:
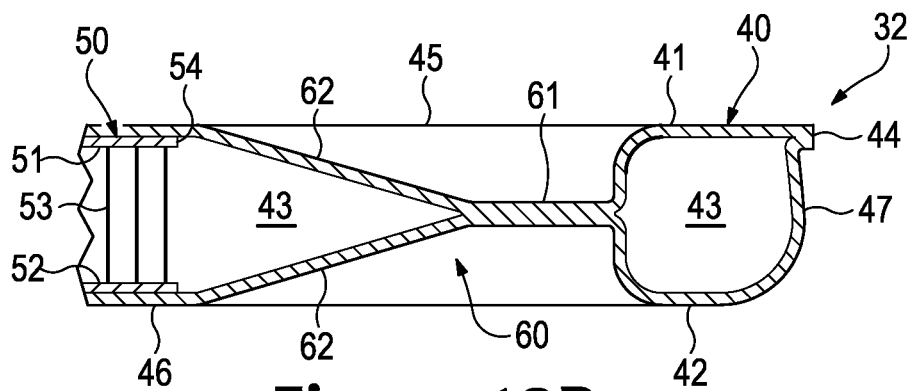
Figure 18C:
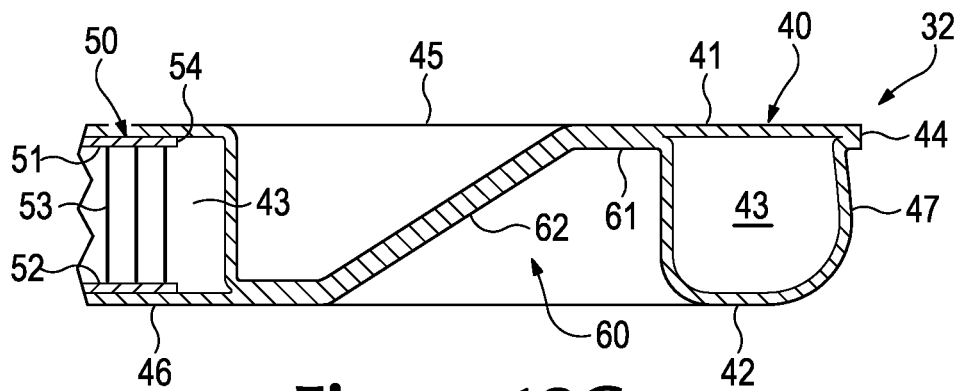
Figure 18D:
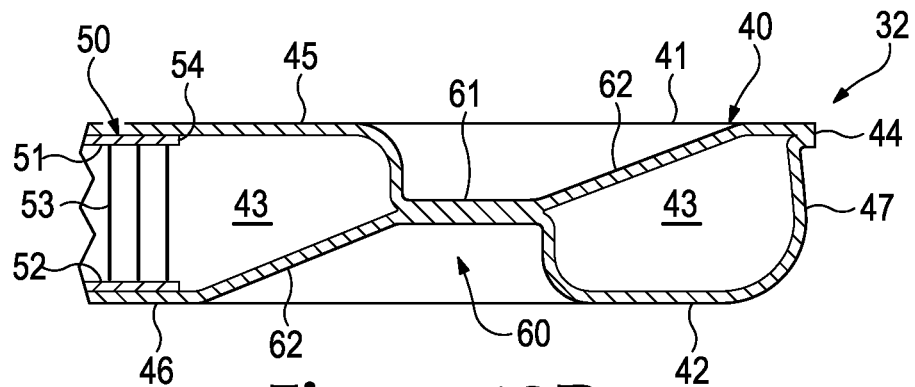

Although interior bond 61 may be located closer to the first plane of first surface 45 than the second plane of second surface 46, interior bond 61 may also be centered between the planes of surfaces 45 and 46, as depicted in FIG. 18A. In a similar configuration, depicted in FIG. 18B, interior bond 61 is centered between the planes of surfaces 45 and 46, and each of barrier portions 41 and 42 form a fold 62 that extends to one of the planes. FIG. 18C depicts a configuration that is similar to FIG. 17L, wherein fold 62 extends between two interior bonds 61 that are located on opposite sides of chamber 32. That is one of the interior bonds 61 is located at the first plane of first surface 45, and the other of the interior bonds 61 is located at the second plane of second surface 46. Referring to FIG. 18D, interior bond 61 is centered between the planes of surfaces 45 and 46, and each of barrier portions 41 and 42 form a fold 62 that extends in opposite directions.

Figure 19A:
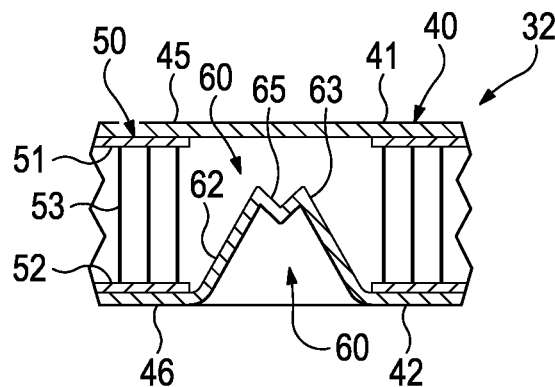
FIG. 19A-19C are cross-sectional views corresponding with FIG. 9B and depicting further configurations of the chamber.
Figure 19B:
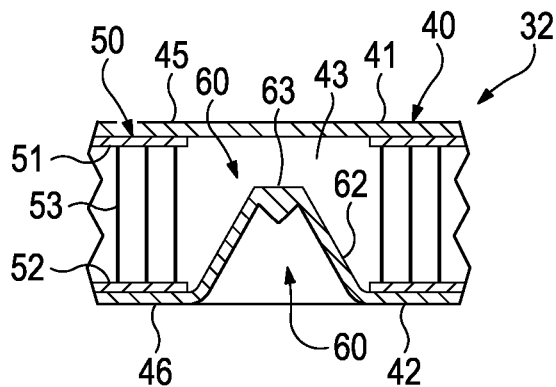
Figure 19C:
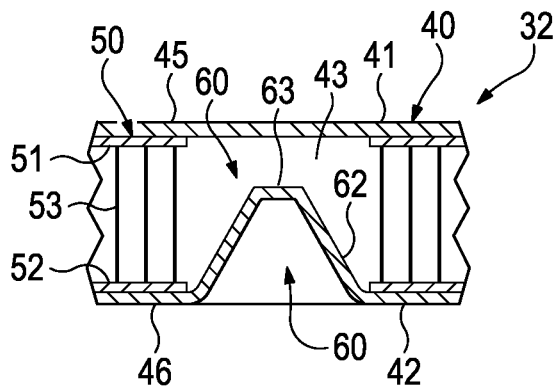

Stabilization structures 60 and 70 impart an advantage of restricting or limiting deformation in chamber 32 due to shearing forces. Moreover, the orientations and configurations of folds 62 and 72 resists deformation. In order to impart additional stability to folds 62 and 72, various features may be molded or otherwise formed in folds 62 and 72. Referring to FIG. 19A, for example, apex 63 of the ridge formed by fold 62 includes an indentation 65 that is located within interior void 43 and extends through a majority of a length of the ridge. Indentation 65 may exhibit less flexibility than other configurations at apex 63, thereby further restricting or limiting deformation in chamber 32. A lower area of apex 63 forms a downwardly-extending point. Referring to FIG. 19B, a top region of apex 63 is planar and a lower region of apex 63 forms a downwardly-extending point. As another example, apex 63 has a squared or planar configuration in FIG. 19C.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A chamber comprising:
   a first barrier portion formed from a polymer material and defining a first surface of the chamber, a majority of the first surface coinciding with a first plane;
   a second barrier portion formed from the polymer material and defining a second surface of the chamber, the first surface being opposite the second surface and a majority of the second surface coinciding with a second plane;
   a peripheral bond that joins the first barrier portion and the second barrier portion to form an interior void within the chamber and seal a fluid within the interior void;
   a first interior bond that is spaced inward from the peripheral bond and joins the first barrier portion and the second barrier portion; and a first fold in the second barrier portion that extends away from the first interior bond and through a majority of a thickness of the chamber, the first fold including a first portion of the second barrier portion and a second portion of the second barrier portion that extend toward one another and are joined at a first junction that is formed at a first angle relative to the first surface, the first junction extending continuously from the first interior bond to the second plane at the first angle.

2. The chamber recited in claim 1, wherein the first fold forms a depression in the second surface.

3. The chamber recited in claim 1, wherein the first angle of the first junction is in a range of 20 to 60 degrees with the first surface.

4. The chamber recited in claim 1, wherein the first junction includes an indentation that is located within the interior void and extends through a majority of a length of the first junction.

5. The chamber recited in claim 1, wherein the first interior bond is located closer to the first plane than the second plane.

6. The chamber recited in claim 1, wherein a tensile member is located within the interior void and secured to the first barrier portion and the second barrier portion, the tensile member being absent in an area of the first interior bond and the first fold.

7. The chamber recited in claim 6, wherein the tensile member has an edge located inward from the peripheral bond and adjacent to the peripheral bond, the edge defining an indentation in the tensile member that extends at least partially around the first interior bond and the first fold.

8. The chamber recited in claim 6, wherein the tensile member is a textile that includes a first layer, a second layer, and a plurality of connecting members extending between the first layer and the second layer, the first layer being joined to the first barrier portion, and the second layer being joined to the second barrier portion.

9. The chamber recited in claim 1, wherein the chamber is incorporated into an article of footwear.

10. A chamber comprising:
a first barrier portion defining a first surface of the chamber, a majority of the first surface substantially coinciding with a first plane;
a second barrier portion defining a second surface of the chamber, the first surface being opposite the second surface, and a majority of the second surface substantially coinciding with a second plane;
a peripheral bond that joins the first barrier portion and the second barrier portion to form an interior void within the chamber and seal a fluid within the interior void;
an interior bond that is spaced inward from the peripheral bond and joins the first barrier portion and the second barrier portion, the interior bond being located within the first plane; and
a fold in the second barrier portion that extends from the interior bond to the second plane and is defined by a pair of sloping surfaces of the second barrier portion, the pair of sloping surfaces terminating at a ridge within the interior void that extends continuously at a first angle from the interior bond to the second plane.

11. The chamber recited in claim 10, wherein an apex of the ridge includes an indentation that (a) is located within the interior void and (b) extends through a majority of a length of the ridge.

12. The chamber recited in claim 10, wherein a tensile member is located within the interior void and secured to the first barrier portion and the second barrier portion, the tensile member being absent in an area of the interior bond and the fold.

13. The chamber recited in claim 12, wherein the tensile member has an edge located inward from the peripheral bond and adjacent to the peripheral bond, the edge defining an indentation in the tensile member that extends at least partially around the interior bond and the fold.

14. The chamber recited in claim 12, wherein the tensile member is a textile that includes a first layer, a second layer, and a plurality of connecting members extending between the first layer and the second layer, the first layer being joined to the first barrier portion, and the second layer being joined to the second barrier portion.

15. The chamber recited in claim 10, wherein the chamber is incorporated into an article of footwear.

16. The chamber recited in claim 1, further comprising a second interior bond that is spaced inward from the peripheral bond and joins the first barrier portion and the second barrier portion,
a second fold in the second barrier portion that extends away from the second interior bond and through a majority of the thickness of the chamber, the second fold including a third portion of the second barrier portion and a fourth portion of the second barrier portion that extend toward one another and are joined at a second junction that is formed at a second angle relative to the first surface, the second junction extending continuously from the second interior bond to the second plane at the second angle.

17. The chamber recited in claim 16, wherein the first fold and the second fold form a depression in the second surface.

18. The chamber recited in claim 16, wherein the first junction and the second junction each form an angle in a range of 20 to 60 degrees with the first surface.

19. The chamber recited in claim 16, wherein the first junction defines an indentation that is located within the interior void and extends through a majority of a length of the first junction.

20. The chamber recited in claim 16, wherein a tensile member is located within the interior void, the tensile member being a textile that includes a first layer, a second layer, and a plurality of connecting members extending between the first layer and the second layer, the first layer being joined to the first barrier portion, and the second layer being joined to the second barrier portion, and the tensile member extending at least partially around the first interior bond, the second interior bond, the first fold, and the second fold.

* * * * *